(12) United States Patent
Hirota et al.

(10) Patent No.: US 7,884,908 B2
(45) Date of Patent: Feb. 8, 2011

(54) LIQUID CRYSTAL DISPLAY DEVICE

(75) Inventors: Shoichi Hirota, Hitachi (JP); Masaki Matsumori, Naka-gun (JP); Tetsuya Nagata, Hitachinaka (JP); Shinichiro Oka, Hitachi (JP)

(73) Assignee: Hitachi Displays, Ltd., Chiba (JP)

( * ) Notice: Subject to any disclaimer, the term of this patent is extended or adjusted under 35 U.S.C. 154(b) by 224 days.

(21) Appl. No.: 12/342,152

(22) Filed: Dec. 23, 2008

(65) Prior Publication Data
US 2009/0168002 A1 Jul. 2, 2009

(30) Foreign Application Priority Data
Dec. 28, 2007 (JP) ............... 2007-339631

(51) Int. Cl.
*G02F 1/1337* (2006.01)
(52) U.S. Cl. .............. 349/132; 349/113; 349/114; 349/129; 349/141; 349/142
(58) Field of Classification Search ......... 349/141–142, 349/113–114, 123, 129
See application file for complete search history.

(56) References Cited
U.S. PATENT DOCUMENTS

| 6,122,103 | A | 9/2000 | Perkins et al. |
|---|---|---|---|
| 6,867,830 | B1 | 3/2005 | Hirota et al. |
| 2005/0088598 | A1 | 4/2005 | Matsumori et al. |
| 2005/0264720 | A1 | 12/2005 | Itou et al. |
| 2005/0271833 | A1 | 12/2005 | Matsumori et al. |
| 2007/0013835 | A1 | 1/2007 | Matsushima et al. |
| 2008/0284949 | A1 | 11/2008 | Matsumori et al. |

FOREIGN PATENT DOCUMENTS

| JP | 2000-298277 | 10/2000 |
|---|---|---|
| JP | 3641708 | 2/2005 |
| JP | 2005-128359 | 5/2005 |
| JP | 2005-338264 | 12/2005 |
| JP | 2005-351924 | 12/2005 |
| JP | 2007-047734 | 2/2007 |
| JP | 2008-180875 | 8/2008 |

OTHER PUBLICATIONS

U.S. Appl. No. 12/192,202, filed Aug. 15, 2008, Matsumori et al.

*Primary Examiner*—David Nelms
*Assistant Examiner*—Phu Vu
(74) *Attorney, Agent, or Firm*—Antonelli, Terry, Stout & Kraus, LLP.

(57) ABSTRACT

Each pixel has a transmissive area and a reflective area. A first alignment process area and a second alignment process area are placed such that an overlapping region is created in part of the reflective area. A region where the liquid crystal alignment direction shifts continuously is created in a boundary between the transmissive area and the reflective area without exception. A first liquid crystal alignment region is formed wider than the transmissive area, and a second liquid crystal alignment region is formed narrower than the reflective area.

16 Claims, 17 Drawing Sheets

LIQUID CRYSTAL DISPLAY DEVICE

CROSS-REFERENCE TO RELATED APPLICATION

The present application claims priority from Japanese application JP2007-339631 filed on Dec. 28, 2007, the content of which is hereby incorporated by reference into this application.

BACKGROUND OF THE INVENTION

1. Field of the Invention

The present invention relates to a liquid crystal display device, and more particularly, to a transflective liquid crystal display device.

2. Description of the Related Art

Liquid crystal display devices, being thin, light-weight, and low in power consumption, are used as a display monitor in a wide array of electronic devices including notebook personal computers, portable information terminals, cellular phones, and digital cameras. Unlike CRT displays and plasma displays, liquid crystal display devices do not emit light themselves but utilize external light to display images and other information by controlling the amount of incident light. Liquid crystal display devices can display images in multiple colors when equipped with a color filter, which has multiple colors, as light control elements.

Liquid crystal display devices of this type have a pair of substrates (hereinafter also referred to as "first substrate and second substrate") between which a liquid crystal layer is held to form liquid crystal cells, and turn an electronic latent image into a visible image by applying an electric field to the liquid crystal layer and thus controlling the molecular orientation of a liquid crystal composition that constitutes the liquid crystal layer. Liquid crystal display devices are classified into passive matrix type and active matrix type by driving method. Currently, active matrix liquid crystal display devices are predominant because of their capability to display high-definition images at high speed. In active matrix liquid crystal display devices, the first substrate has active elements (switching elements), typically, thin-film transistors, for selecting pixels, and the second substrate has a color filter painted in three colors for color display.

Many of cellular phones and other similar information terminals called mobile devices employ transflective liquid crystal display devices, which can use selectively or simultaneously a reflective method where an image is displayed with light entering from the viewer's side and a transmissive method where an image is displayed with transmitted light of light incident on the opposite side to the viewer's side.

Not being self-luminous, liquid crystal display devices need to visualize an electronic latent image with lighting that uses visible light which then exits as image light to the viewer's side. A method in which natural light (ambient light) or other illumination light is cast from the viewer's side is called a reflective method, whereas a method in which illumination light is cast from the opposite side to the viewer's side is called a transmissive method. Liquid crystal display devices that can handle the method of casting illumination light from the viewer's side and the method of casting illumination light from the opposite side to the viewer's side both are called transflective (half-transmissive, half-reflective) liquid crystal display devices.

Transflective liquid crystal display devices which have the properties of transmissive LCDs and reflective LCDs both provide a good visibility in a diversity of environments from the dark indoors to the bright outdoors. Because of their good outdoor visibility, transflective liquid crystal display devices are often employed in the above mobile devices. It is common for recent mobile devices to have a camera function and a function of browsing the Web which holds numerous pieces of image data and, as a result, high image quality is demanded from liquid crystal display devices for mobile devices.

Conventional transflective liquid crystal display devices make the transmissive display method and the reflective display method compatible by attaching a retardation film between a polarizing plate and a substrate of a liquid crystal cell such that the optical axis of the retardation film runs in a direction different from the optical axis direction of the polarizing plate. With retardation films which have a fluctuating degree of retardation without exception, it is difficult to raise the contrast of light transmission. To address this difficulty, transflective liquid crystal display devices that do not need a retardation film have been proposed in, for example, JP 2005-338264 A and JP 2007-47734 A.

Liquid crystal display devices disclosed in these documents both employ, as a liquid crystal display method, in-plane switching (hereinafter abbreviated as IPS) in which liquid crystal molecules are driven with a mainly lateral electric field generated between a pixel electrode and a common electrode which are formed on the same substrate. IPS does not need a retardation film whose optical axis runs in a direction different from the optical axis direction of the polarizing plate, and therefore is easy to raise the light transmission contrast. In addition to the above documents, U.S. Pat. No. 6,122,103 B is given as a related art relevant to the present invention.

The liquid crystal display devices disclosed in JP 2005-338264 A and JP 2007-47734 A both have such a feature that liquid crystal molecules are aligned in different directions in a transmissive area and a reflective area. In the following description, aligning liquid crystal molecules in different directions in a transmissive area and a reflective area, or any other state in which the direction of the liquid crystal alignment differs among multiple regions within a pixel, is called alignment-segmentation.

One of processes that have been proposed to accomplish alignment-segmentation is to perform a partial alignment process such as mask rubbing region by region. However, performing a partial alignment process for a transmissive area and a reflective area separately could produce regions that receive neither the alignment process for a transmissive area nor the alignment process for a reflective area if the substrate is not positioned properly during a switch between the former and the latter. Regions that receive no alignment process contain misaligned liquid crystal molecules, which can affect displayed images.

SUMMARY OF THE INVENTION

The present invention has been made in view of the above, and an object of the present invention is therefore to provide a liquid crystal display device capable of high-quality image display at high yield, specifically, a alignment-segmentation, IPS transflective liquid crystal display device of high image quality that is measured by such quality indicators as high transmittance, high reflectance, and high contrast.

A liquid crystal display device according to the present invention includes: a first substrate on which pixels are arranged in matrix, the pixels each having a transmissive area and a reflective area both; a second substrate; and a liquid crystal layer which is held between an alignment film as the topmost layer of the first substrate and an alignment film as the topmost layer of the second substrate, and which is driven with a voltage applied between common electrodes and signal electrodes, the common electrodes and the signal electrodes being provided on the first substrate. In the liquid crystal display device: a first liquid crystal alignment region and a second liquid crystal alignment region each having a different liquid crystal alignment direction are created; the first liquid crystal alignment region and the second liquid crystal alignment region are in contact with each other within each of the pixels; and an alignment relaxation region in which the alignment direction of the first liquid crystal alignment region and the alignment direction of the second liquid crystal alignment region shift continuously toward each other is provided between the adjoining first liquid crystal alignment region and second liquid crystal alignment region. The first liquid crystal alignment region is formed wider than the transmissive area and the second liquid crystal alignment region is formed narrower than the reflective area.

According to an aspect of the present invention, a liquid crystal alignment method in at least one of the first substrate and the second substrate is photoalignment and, in at least one of the first substrate and the second substrate, a photoalignment process may be performed on the entire surface before performing a partial photoalignment process on one of the first liquid crystal alignment region and the second liquid crystal alignment region.

According to an aspect of the present invention, a liquid crystal alignment method in at least one of the first substrate and the second substrate may be rubbing and, in at least one of the first substrate and the second substrate, a rubbing process may be performed on the entire surface before performing a partial mask rubbing process on one of the first liquid crystal alignment region and the second liquid crystal alignment region.

According to an aspect of the present invention, in the case where liquid crystal molecules in the first liquid crystal alignment region and the second liquid crystal alignment region are aligned by performing an alignment process separately and partially at least twice, an alignment process overlapping region may be provided in which alignment process regions of the first liquid crystal alignment region and the second liquid crystal alignment region partially overlap each other, and the overlapping region may have a width greater than required for a positioning precision in the alignment process performed separately and partially at least twice.

According to an aspect of the present invention, the first liquid crystal alignment region and the second liquid crystal alignment region may come into contact with each other within the reflective area.

According to an aspect of the present invention, the second liquid crystal alignment region may be divided into regions to which different liquid crystal alignment directions are set for three primary colors.

Further, an aspect of the present invention may provide a liquid crystal display device in which a liquid crystal alignment method in at least one of substrates is photoalignment, and in which the photoalignment is performed through alignment-segmentation in which overall light exposure is performed in a single step using a photomask that polarizes along multiple polarization axes in different directions for different regions. The photomask may have a plurality of grating polarizers having different arrangement directions and placed side by side.

According to an aspect of the present invention, a comb-teeth-shaped signal electrode in the transmissive area may be arranged in at least two different arrangement directions, and the arrangement directions of the signal electrode in the transmissive area may be different from an arrangement direction of the comb-teeth-shaped signal electrode in the reflective area.

According to an aspect of the present invention, the reflective area may be shaped approximately like a parallelogram, and a longitudinal direction of the comb-teeth-shaped signal electrode in the reflective area may be one of orthogonal to and parallel to a side of the parallelogram.

Further, an aspect of the present invention may provide a liquid crystal display device in which the same liquid crystal alignment direction is set to the first liquid crystal alignment region and the second liquid crystal alignment region on the second substrate. A twist angle of the second liquid crystal alignment region in this case is desirably from 63° to 64°.

According to the present invention, the liquid crystal display device capable of high-quality image display is obtained at high yield, specifically, a alignment-segmentation, IPS transflective liquid crystal display device of high image quality that is measured by such quality indicators as high transmittance, high reflectance, and high contrast is obtained. When equipped with this liquid crystal display device, various information terminals can have high quality.

DETAILED DESCRIPTION OF THE INVENTION

Preferred embodiments of the present invention are described below in detail with reference to the drawings.

First Embodiment

Figure 1A:
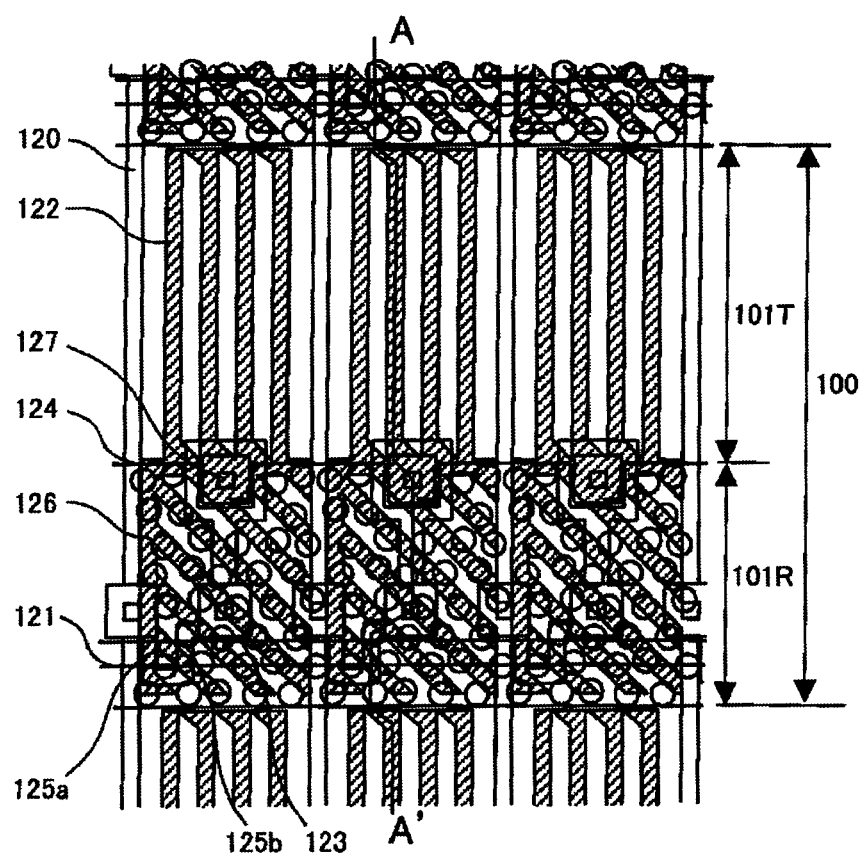
FIG. 1A is a plan view illustrating, enlarged, part of an active matrix substrate of a liquid crystal display device according to a first embodiment of the present invention.
Figure 2:
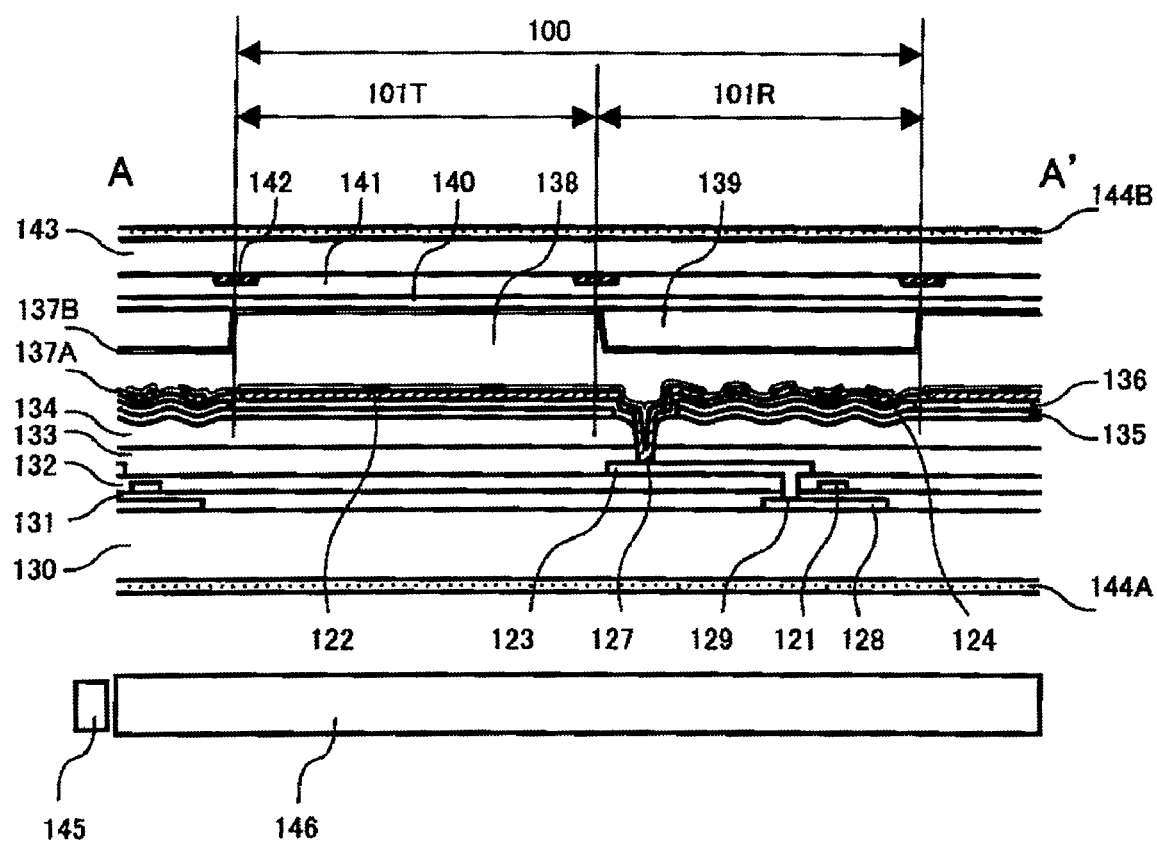
FIG. 2 is a sectional view of the liquid crystal display device of FIG. 1A taken along the line A-A'.

FIG. 1A is a plan view illustrating, enlarged, part of an active matrix substrate of a liquid crystal display device according to a first embodiment of the present invention. FIG. 2 is a sectional view of the liquid crystal display device of FIG. 1A taken along the line A-A'. The liquid crystal display device according to the first embodiment of the present invention has a liquid crystal layer 138 which fills the space between a first transparent substrate (hereinafter referred to as first substrate) 130 and a second transparent substrate (hereinafter referred to as second substrate) 143. On the first substrate 130, thin-film transistors 125a and 125b, signal lines (data lines) 120, scanning lines 121, wiring, and the like are arranged in matrix. The thin-film transistors 125a and 125b are provided for each of subpixels (hereinafter simply referred to as pixels) 100 which constitute a single color pixel. Placed on the second substrate 143 are a color filter and a black matrix. In short, the liquid crystal display device of the first embodiment of the present invention uses the active matrix driving method.

Optical films including a lower polarizing plate 144A and an upper polarizing plate 144B are attached to surfaces of the first substrate 130 and the second substrate 143 that are opposite from the liquid crystal layer 138. The liquid crystal display device of this embodiment is capable of transmissive display of any brightness by modulating the transmittance of the upper polarizing plate 144B. This modulation is accomplished by modulating the polarization of light emitted from a backlight and passing through the lower polarizing plate 144A by means of electric control of the liquid crystal layer 138. The backlight includes an LED 145 and a light guiding member 146. An area for the transmissive display is referred to as transmissive area 101T.

The liquid crystal display device of this embodiment also has in each pixel 100 a reflective area 101R in which reflective display of any brightness is possible by modulating the polarization of incident light through the upper polarizing plate 144B by means of electric control of the liquid crystal layer 138, and modulating the transmittance in the passage through the upper polarizing plate 144B again. The liquid crystal display device according to this embodiment thus constitutes a transflective liquid crystal display device capable of transmissive display and reflective display simultaneously in each pixel.

As described, the liquid crystal display device of this embodiment has as a light source a backlight which includes, for example, the LED 145 and the light guiding member 146. Other components of the liquid crystal display device of this embodiment include the first substrate 130 having the lower polarizing plate 144A attached thereto, the second substrate 143, multiple pixels which are formed in matrix on the first substrate 130, and a driver IC and an interface which are not shown in the drawings. Out of the multiple pixels arranged in matrix, FIG. 1A illustrates mainly three pixels set side by side in the left-right (lateral) direction of FIG. 1A and some of pixels arranged to the left and right and above and below the three pixels in a repetitive pattern.

In each of the pixels 100 arranged in matrix, at least a semiconductor layer 128, a gate insulating film 131, the scanning line (gate electrode) 121, an insulating film 132, the signal line 120, a signal electrode (source/drain electrode) 123, a contact hole 129, an insulating film 133, an applied insulating film 134, a common electrode 135, a reflecting layer 124, an interlayer insulating film 136, a signal electrode (pixel electrode) 122, a contact hole 127, and a lower alignment film 137A are formed on the first substrate 130. The signal line 120 and the signal electrode 123 are formed from the same metal layer. The contact hole 129 electrically connects the semiconductor layer 128 and the signal electrode 123. The reflecting layer 124 is formed from a metal layer for reflecting external light with efficiency. The contact hole 127 electrically connects the signal electrode 122 and the signal electrode 123. Formed on the second substrate 143 in each pixel 100 are, at least, a black matrix 142, a color filter 140, an overcoat 141, a reflection gap control layer 139, and an upper alignment film 137B. The liquid crystal layer 138 fills a gap created by joining the two substrates. At the intersection between each signal line 120 and each scanning line 121, the polysilicon thin-film transistors 125a and 125b are formed to control whether or not the scanning line 121 is to be controlled such that a signal potential supplied from the outside through the signal line 120 is transmitted to the liquid crystal layer 138.

Each pixel 100 has the transmissive area 101T in which transmissive display is performed by controlling the intensity of illumination light which is emitted from the backlight and the reflective area 101R in which reflective display is performed by controlling the reflectance of external light. The reflection gap control layer 139 and the reflecting layer 124 are formed only in the reflective area 101R. The reflection gap control layer 139 is a structure for adjusting the liquid crystal layer thickness in the reflective area 101R independently of the liquid crystal layer thickness in the transmissive area 101T. A concavo-convex structure 126 for controlling the scattering profile of external light is formed under the reflecting layer 124. The liquid crystal layer 138 is driven with a voltage applied between the common electrode 135 and the signal electrode 122. The liquid crystal display device according to this embodiment operates on a principle usually called in-plane switching (IPS).

Figure 1B:
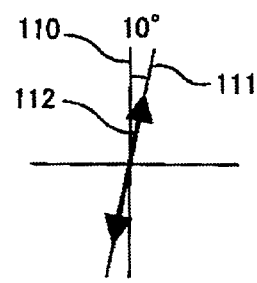
FIG. 1B illustrates a liquid crystal alignment direction, the optical axis, and a comb-teeth-shaped electrode arrangement direction in a transmissive area according to the first embodiment of the present invention.
Figure 1C:
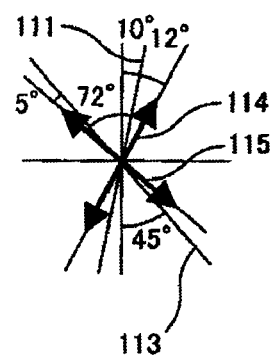
FIG. 1C illustrates liquid crystal alignment directions, the optical axis, and a comb-teeth-shaped electrode arrangement direction in a reflective area according to the first embodiment of the present invention.

The liquid crystal display device according to this embodiment employs alignment-segmentation and the main direction of the liquid crystal alignment differs between the transmissive area 101T and the reflective area 101R. Also, the direction in which a comb-teeth-shaped electrode is arranged differs between the transmissive area 101T and the reflective area 101R. FIGS. 1B and 1C illustrate the liquid crystal alignment direction, the comb-teeth-shaped electrode arrangement direction, and the polarization axis in the transmissive area 101T and the reflective area 101R, respectively. A liquid crystal alignment direction 112 in the transmissive area 101T is the same on the first substrate 130 and the second substrate 143: in short, the liquid crystal alignment in the transmissive area 101T is homogeneous alignment. The liquid crystal alignment direction 112 is parallel to or orthogonal to an optical axis (transmission axis or absorption axis) 111 of the lower polarizing plate 144A and the upper polarizing plate 144B. In the liquid crystal display device according to this embodiment, a longitudinal direction 110 of the comb-teeth-shaped signal electrode 122 in the transmissive area 101T and the liquid crystal alignment direction 112 form an angle of 10°.

On the other hand, in a second liquid crystal alignment region located in the reflective area 101R, a liquid crystal alignment direction 115 on the first substrate 130 and a liquid crystal alignment direction 114 on the second substrate 143 are different from each other: in short, the liquid crystal alignment in the second liquid crystal alignment region is twist nematic alignment. Also, a longitudinal direction 113 of the comb-teeth-shaped signal electrode 122 in the reflective area 101R differs from the longitudinal direction 110 of the comb-teeth-shaped signal electrode 122 in the transmissive area 101T. In this embodiment, 72° is set as a twist angle which is an angle formed by the liquid crystal alignment direction 115 on the first substrate 130 and the liquid crystal alignment direction 114 on the second substrate 143. An angle formed by the optical axis 111 of the polarizing plates 144 in the reflective area 101R and the liquid crystal alignment direction 114 on the second substrate 143 is set to 12°. An angle formed by the longitudinal direction 110 of the comb-teeth-shaped signal electrode 122 in the transmissive area 101T and the longitudinal direction 113 of the comb-teeth-shaped signal electrode 122 in the reflective area 101R is set to 45°. An angle formed by the liquid crystal alignment direction 115 on the first substrate 130 in the reflective area 101R and the longitudinal direction 113 of the comb-teeth-shaped signal electrode 122 in the reflective area 101R is set to 5°. This corresponds to 85° as a pre-twist angle, which is described later.

Figure 3:
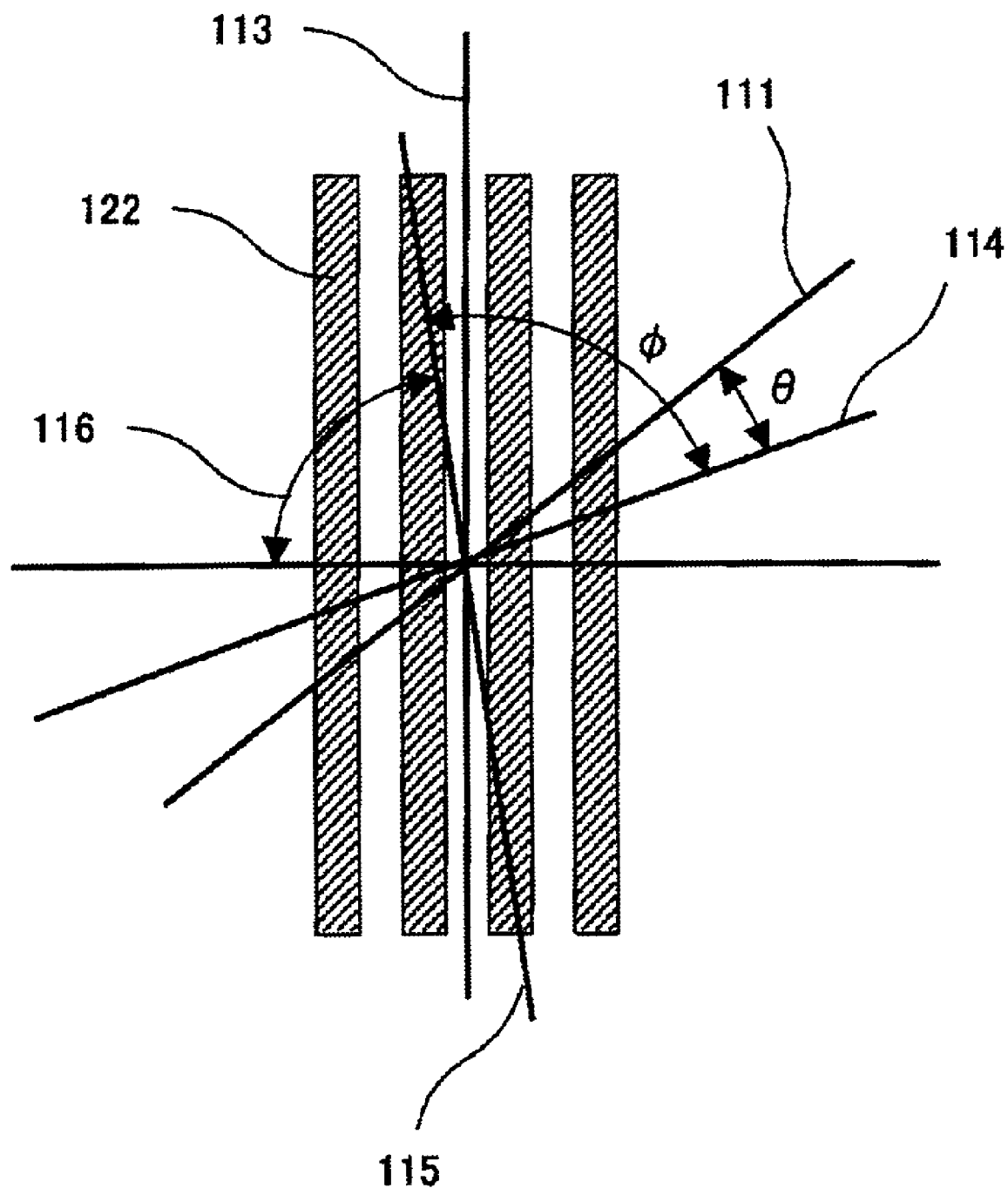
FIG. 3 is an explanatory diagram of how the liquid crystal alignment directions, the optical axis, and the comb-teeth-shaped electrode direction are defined in relation to one another.

The correspondence relation among the liquid crystal alignment directions (114 and 115), the polarizing plate optical axis 111, and the longitudinal direction 113 of the comb-teeth-shaped signal electrode 122 in the reflective area 101R is described in detail with reference to FIG. 3. FIG. 3 is an explanatory diagram of how the liquid crystal alignment directions, the optical axis, and the comb-teeth-shaped electrode direction are defined in relation to one another. An angle formed by the polarizing plate optical axis 111 and the liquid crystal alignment direction 114 on the second substrate 143 is given as θ. The twist angle, which is an angle formed by the liquid crystal alignment direction 115 on the first substrate 130 and the liquid crystal alignment direction 114 on the second substrate 143 is given as φ. An angle 116 formed by the longitudinal direction 113 of the comb-teeth-shaped signal electrode 122 and the liquid crystal alignment direction 115 on the first substrate 130 is called a pre-twist angle.

It is known that a liquid crystal layer aligned by twist nematic alignment is described well by a model using n layers, which are laminated on each other, of birefringent medium whose optical axes are shifted from one another by φ/n. A propagation matrix when n=∞, in particular, is called Jones matrix and is given as the following expression:

$$J_\infty = \begin{pmatrix} a & b \\ -b^* & a^* \end{pmatrix}$$ [Expression 1]

Where $$a = \cos\phi\cos\beta + \frac{1}{\sqrt{1+\alpha^2}}\sin\phi\sin\beta - \frac{i\alpha}{\sqrt{1+\alpha^2}}\cos\phi\sin\beta$$ [Expression 2]

$$b = -\sin\phi\cos\beta + \frac{1}{\sqrt{1+\alpha^2}}\cos\phi\sin\beta - \frac{i\alpha}{\sqrt{1+\alpha^2}}\sin\phi\sin\beta$$ [Expression 3]

$$\alpha = \frac{d\Delta n}{\lambda}\frac{\pi}{\phi}$$ [Expression 4]

$$\beta = \phi\sqrt{1+\alpha^2}$$ [Expression 5]

where d represents the liquid crystal layer thickness in the reflective area 101R, Δn represents the refractive index anisotropy of a liquid crystal material used in the liquid crystal layer 138, and λ represents the wavelength. In reflective display, incident light passes through the liquid crystal layer 138 twice and the propagation matrix is expressed as follows:

$$J_{R\infty} = R(\phi)J_\infty R(-\phi)R_e J_\infty$$ [Expression 6]

where R(φ) represents a rotation matrix and Re represents a matrix inverse. With this, a reflectance R when the polarization is in a parallel Nicols arrangement is calculated as follows:

$$R = \left(\cos^2\beta + \frac{1-\alpha^2}{1+\alpha^2}\sin^2\beta\right)^2 +$$
$$4\alpha^2\left(\frac{\sin^2\beta\sin2\theta}{1+\alpha^2} + \frac{\sin\beta\cos\beta\cos2\theta}{\sqrt{1+\alpha^2}}\right)^2$$ [Expression 7]

In-plane switching (IPS) is usually a normally-black mode in which the display screen is black when no voltage is applied. In the above-mentioned expression, a condition for the normally-black mode is R=0. R=0 is obtained by setting each square term to 0 in the above-mentioned expression.

Figure 4A:
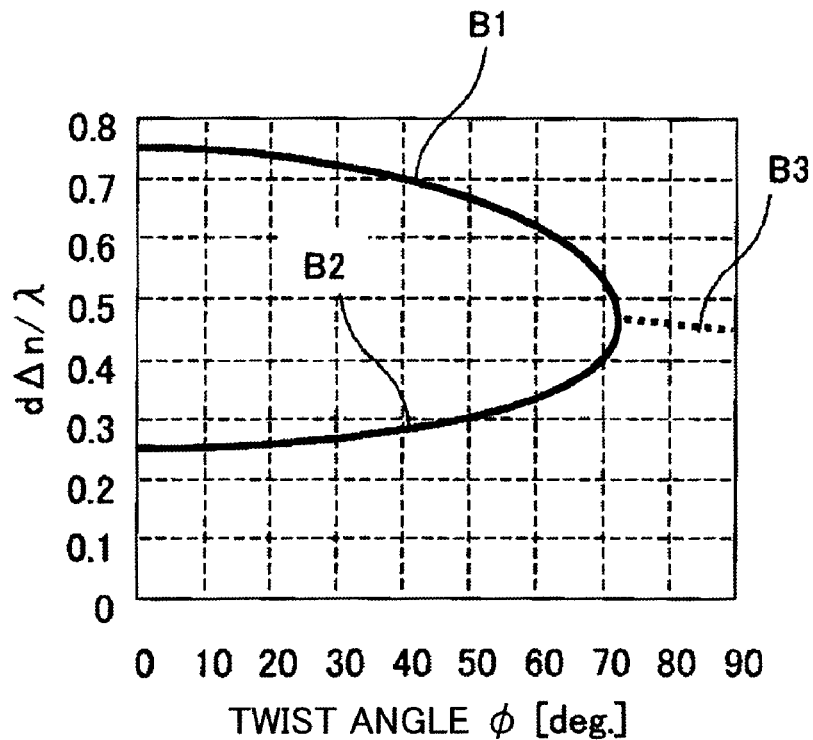
FIG. 4A is a graph illustrating a relation between $d\Delta n/\lambda$ and a twist angle $\phi$.
Figure 4B:
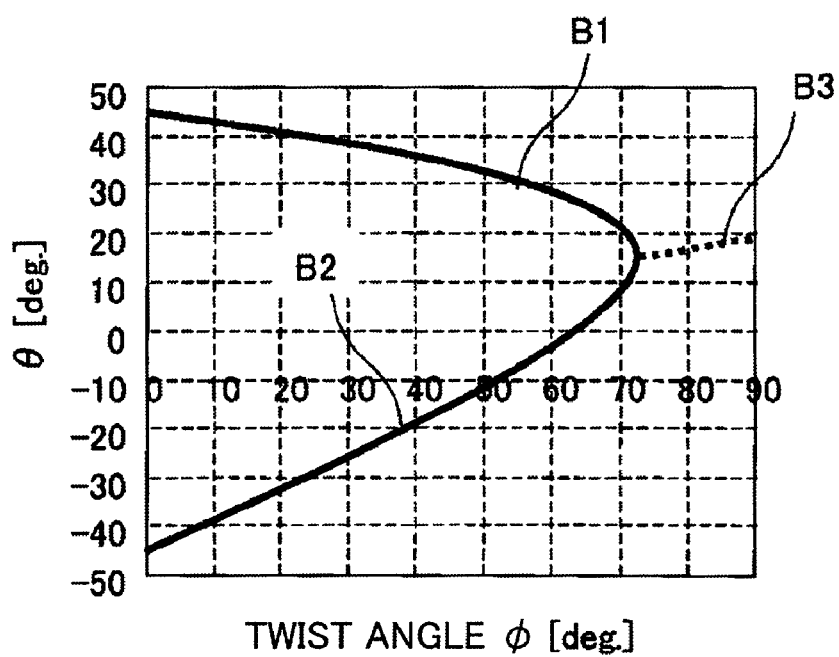
FIG. 4B is a graph illustrating a relation between a liquid crystal alignment angle $\theta$ and the twist angle $\phi$.

FIGS. 4A and 4B are diagrams illustrating the dependency of dΔn/k, or of the liquid crystal alignment angle θ, on the twist angle φ. FIG. 4A illustrates the relation between the twist angle φ and dΔn/λ when R=0 in Expression 7, and the solid line in FIG. 4A represents a solution that satisfies R=0. It is understood from the solid line of FIG. 4A that all conditions that set R=0, namely, the reflection efficiency to 0%, are present in a range where the twist angle is approximately 72.5° or smaller (the solid line is a curve that has a maximum value around φ=72.5°). In a range where the twist angle φ≦72.5°, the optimum condition of dΔn/λ has two values for one value of the twist angle φ, in other words, forks into two branches B1 and B2.

When the twist angle φ is larger than 72.5° (φ>72.5°), the optimum condition where the efficiency is maximum can be calculated from the following expressions:

∂R/∂(Δn/λ)=0 [Expression 8]

∂²R/∂(dΔn/λ)²>0 [Expression 9]

The dotted line (B3) of FIG. 4A represents a solution of Expressions 8 and 9.

FIG. 4B illustrates the dependency of θ on the twist angle φ which is derived from conditions illustrated in FIG. 4A. B1, B2, and B3 of FIG. 4B correspond to B1, B2, and B3 of FIG. 4A, respectively. As described above, the optimum condition of dΔn/λ has two values for one value of the twist angle φ in a range where the twist angle φ≦72.5°. The smaller din is preferred from the standpoint of wavelength dispersion, and a condition at the branch B2 should be employed.

Figure 5A:
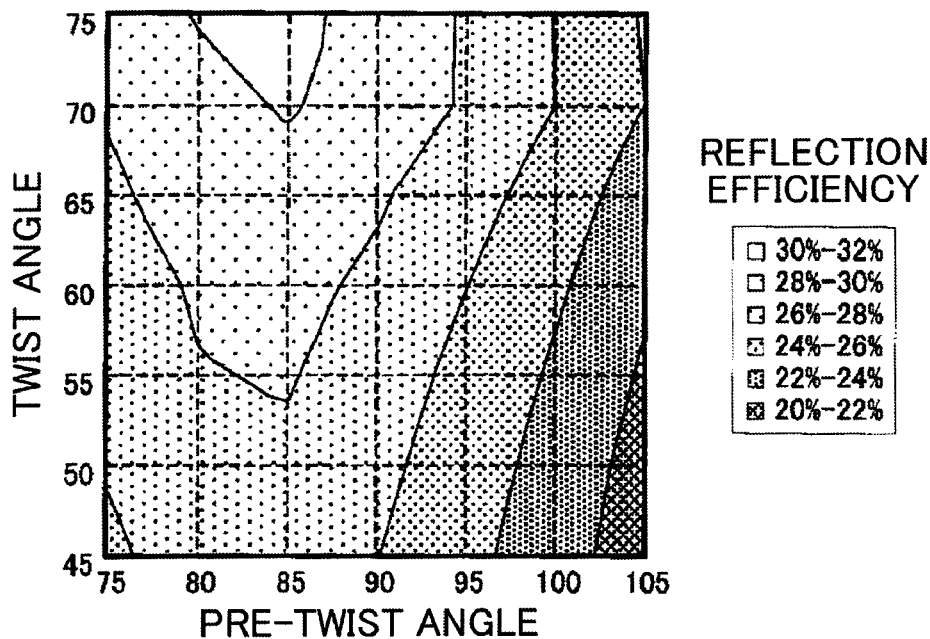
FIG. 5A is an explanatory chart of a dependency of reflection efficiency on the twist angle $\phi$ and a pre-twist angle.
Figure 5B:
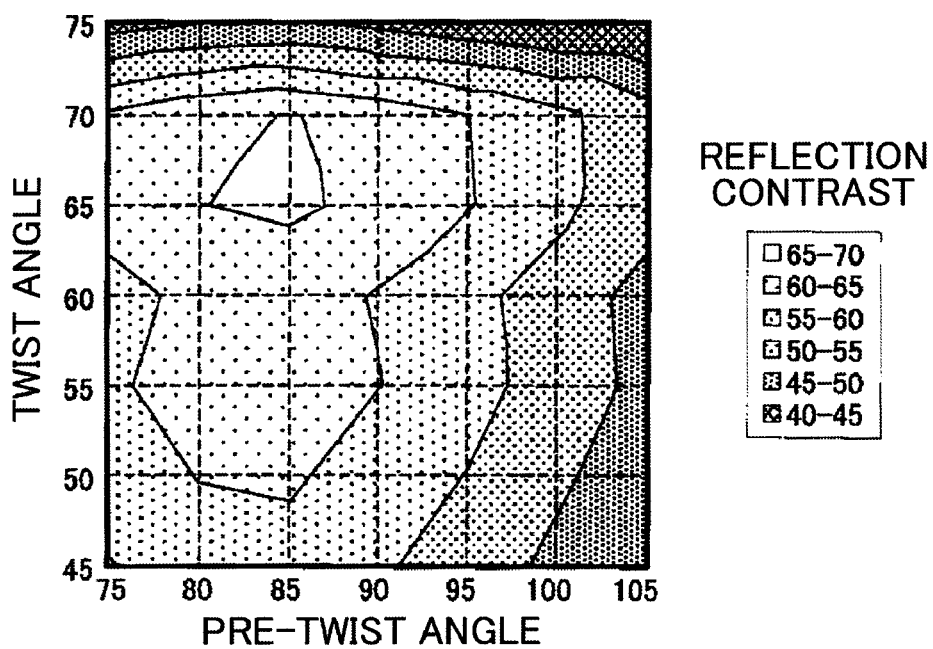
FIG. 5B is an explanatory chart of a dependency of reflection contrast on the twist angle $\phi$ and the pre-twist angle.

FIGS. 5A and 5B illustrate a reflection efficiency and a reflection contrast that are obtained by using the pre-twist angle defined in FIG. 3 as a parameter under the optimum conditions B2 and B3 of dΔn/λ for one value of the twist angle φ in FIGS. 4A and 4B. From the standpoint of reflection efficiency, a larger twist angle is preferred and the pre-twist angle is desirably around 85°. The reflection contrast rapidly drops past the branch B2 (i.e., in a range where φ≦72.5°) of the above-described two optimum conditions B2 and B3 whereas, within the range of the branch B2, a larger twist angle equals a higher reflection contrast. A pre-twist angle at which the reflection contrast is high is around 85°. Based on FIGS. 4A and 4B, desirable values of the twist angle φ, the liquid crystal alignment angle θ, and the pre-twist angle (the angle 116 formed by the longitudinal direction 113 of the comb-teeth-shaped signal electrode 122 and the liquid crystal alignment direction 115 on the first substrate 130) in the reflective area 101R are 72°, 12°, and 85°, respectively.

Figure 6A:
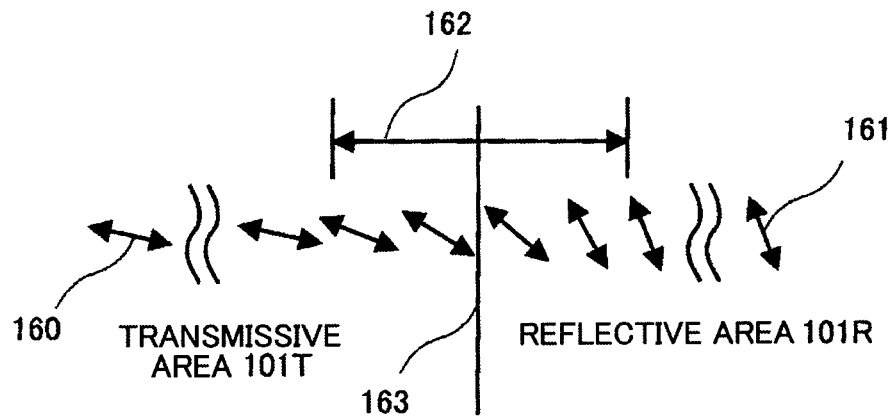
FIG. 6A is an explanatory diagram illustrating how liquid crystal molecules are aligned in a boundary between a first liquid crystal alignment region and a second liquid crystal alignment region.
Figure 6B:
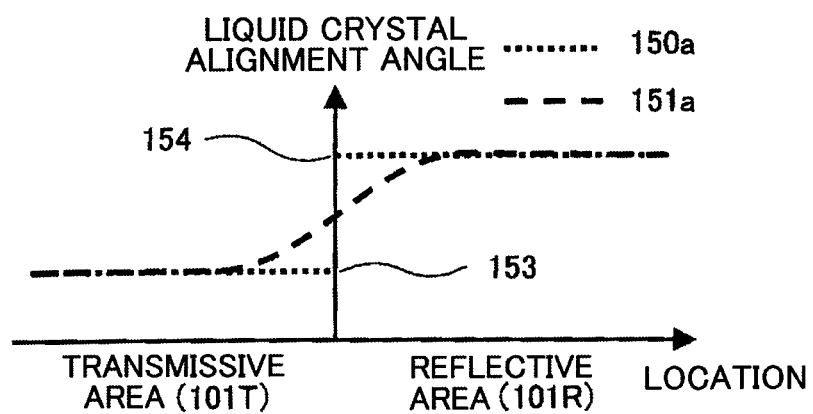
FIG. 6B is an explanatory diagram illustrating how liquid crystal molecules are aligned in the boundary between the first liquid crystal alignment region and the second liquid crystal alignment region.
Figure 6C:
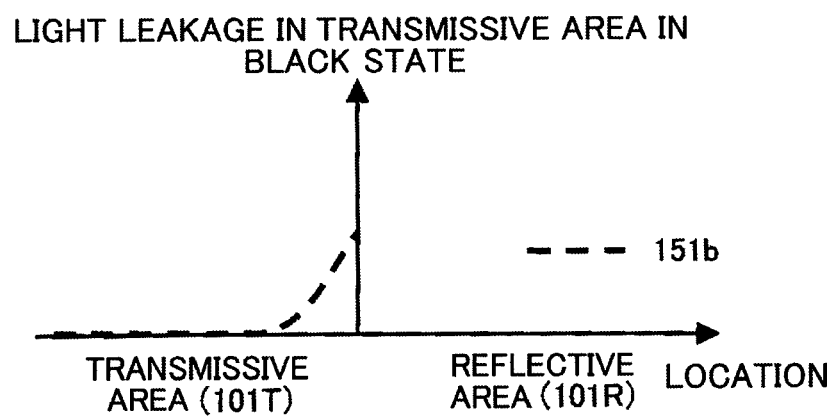
FIG. 6C is an explanatory diagram illustrating how liquid crystal molecules are aligned in the boundary between the first liquid crystal alignment region and the second liquid crystal alignment region.

Described next is a alignment-segmentation process. Problems that arise from employing alignment-segmentation in an IPS transflective liquid crystal display device are described in detail with reference to FIGS. 6A to 6C. FIGS. 6A to 6C are explanatory diagrams illustrating how liquid crystal molecules are aligned in a boundary between the first liquid crystal alignment region and the second liquid crystal alignment region. To place regions that have received different alignment processes in a manner that brings the regions into contact with each other creates between the two regions an alignment relaxation region 162 where the liquid crystal alignment direction shifts continuously. FIG. 6A illustrates the alignment relaxation region 162 created by alignment-segmentation that brings the first liquid crystal alignment region and the second liquid crystal alignment region into contact with each other at a boundary 163 between the transmissive area 101T and the reflective area 101R. In this alignment relaxation region 162, the liquid crystal alignment directions shift continuously from the direction of a liquid crystal molecule 160, which is aligned in the main alignment direction in the transmissive area 101T, to the direction of a liquid crystal molecule 161, which is aligned in the main alignment direction in the reflective area 101R.

The boundary 163 between the transmissive area 101T and the reflective area 101R corresponds to an edge of the reflecting layer 124 in FIGS. 1A and 2. FIG. 6B illustrates a continuous shift (151a) of the liquid crystal alignment angle from a main liquid crystal alignment direction 153 in the transmissive area 101T to a main liquid crystal alignment direction 154 in the reflective area 101R in comparison with a discrete shift (150a) of the liquid crystal alignment direction. FIG. 6C illustrates the positional dependency of light leakage, a phenomenon in which light leaks in the transmissive area while the display is in a black state, when liquid crystal molecules are aligned as illustrated in FIG. 6B. Exposure of the alignment relaxation area 162 in the transmissive area 101T causes light leakage in the black state, thus lowering the contrast ratio.

Figure 7A:
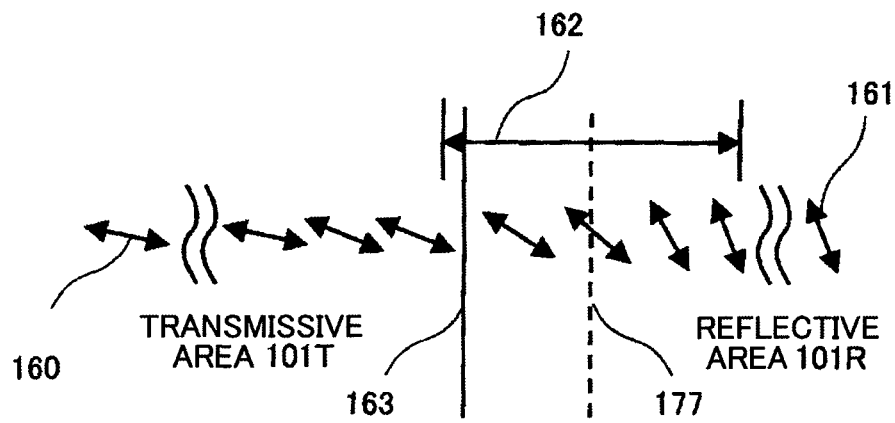
FIG. 7A is an explanatory diagram illustrating how liquid crystal molecules are aligned in the boundary between the first liquid crystal alignment region and the second liquid crystal alignment region.
Figure 7B:
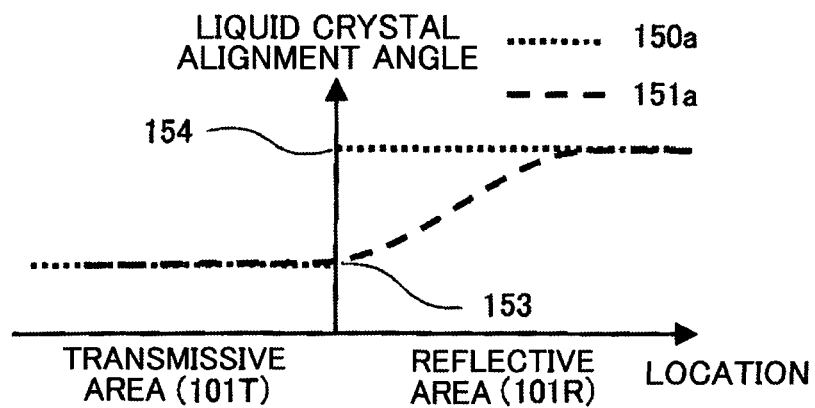
FIG. 7B is an explanatory diagram illustrating how liquid crystal molecules are aligned in the boundary between the first liquid crystal alignment region and the second liquid crystal alignment region.
Figure 7C:
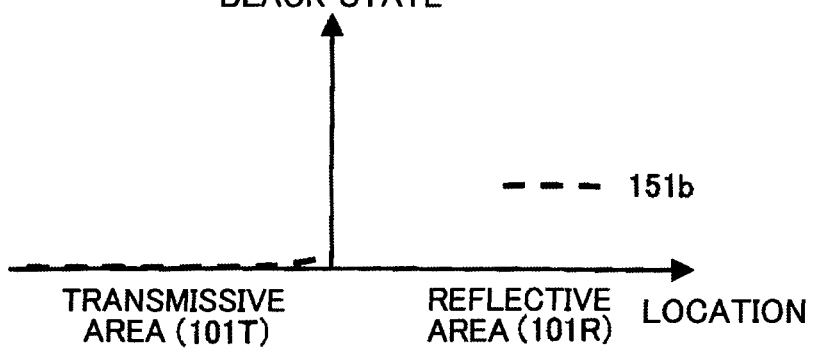
FIG. 7C is an explanatory diagram illustrating how liquid crystal molecules are aligned in the boundary between the first liquid crystal alignment region and the second liquid crystal alignment region.

A structure for solving the problem of lowered contrast ratio is described with reference to FIGS. 7A to 7C. FIGS. 7A to 7C are explanatory diagrams illustrating how liquid crystal molecules are aligned in a boundary between the first liquid crystal alignment region and the second liquid crystal alignment region. In FIGS. 6A to 6C, a switch of alignment direction for alignment-segmentation takes place in the boundary 163 between the transmissive area 101T and the reflective area 101R. In FIGS. 7A to 7C, a boundary 177 where the alignment direction is switched for alignment-segmentation (alignment-segmentation boundary 177) is moved from the boundary 163 between the transmissive area 101T and the reflective area 101R onto the reflecting layer to settle within the reflective area 101R. The width of the alignment relaxation region 162, which varies depending on the liquid crystal material used, the liquid crystal layer thickness, and the alignment directions of the respective regions, is about 10 μm. It is therefore desirable to set the distance from the alignment-segmentation boundary 177 to the boundary 163 between the transmissive area 101T and the reflective area 101R to approximately 5 μm or more.

While the boundary 163 here is a boundary between the transmissive area 101T and the reflective area 101R, the boundary 163 in the case where a black matrix (light shielding area) is provided in the boundary between the transmissive area 101T and the reflective area 101R is a boundary between an opening in the transmissive area 101T and the black matrix (light shielding area). With the above-mentioned structure, the alignment relaxation region 162 between the first liquid crystal alignment region and the second liquid crystal alignment region is exposed in the transmissive area 101T over a reduced width, thereby reducing light leakage in the transmissive area in the black state and improving the light transmission contrast as illustrated in FIG. 7C.

Figure 8:
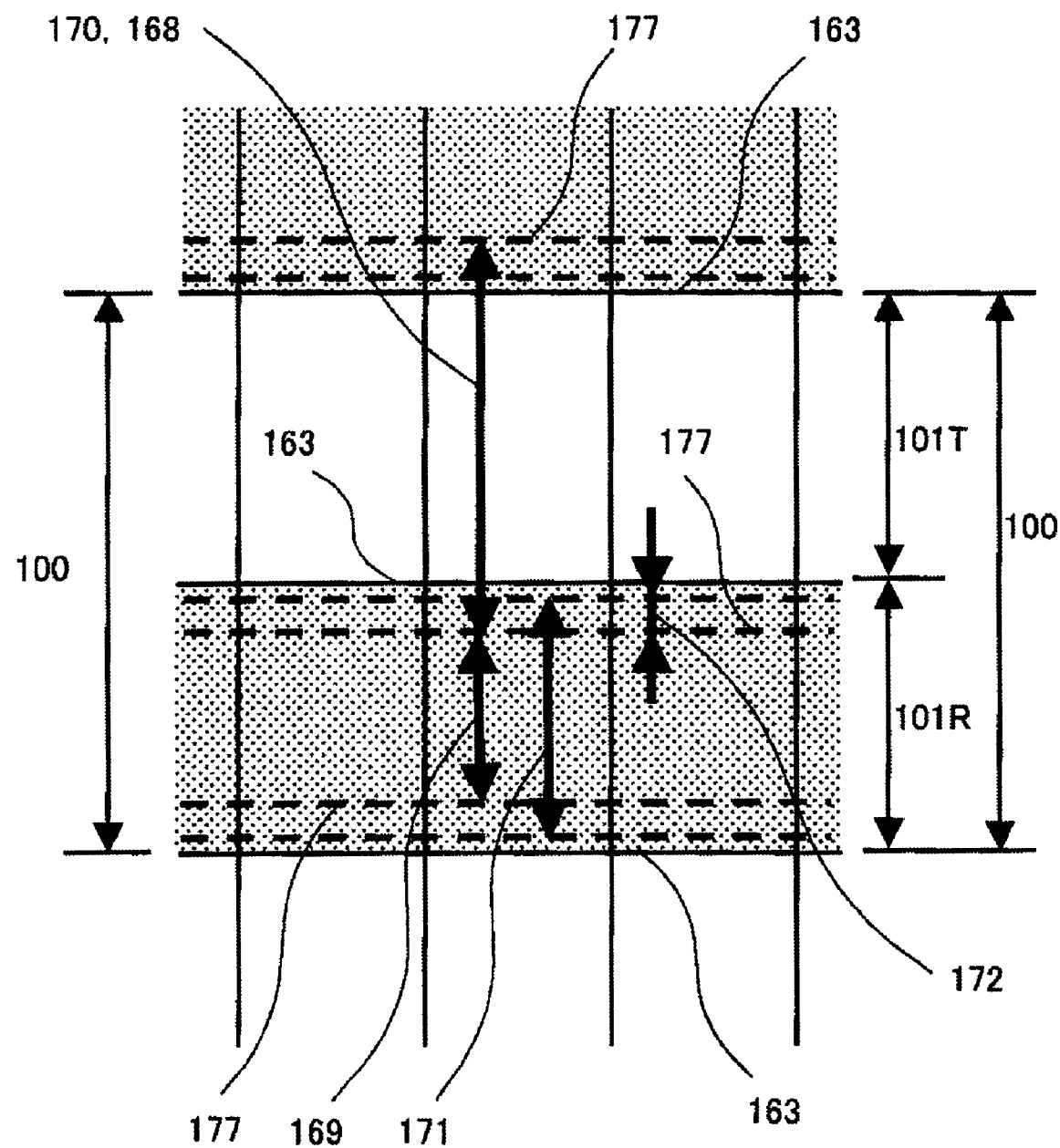
FIG. 8 is a diagram illustrating an example of a positional relation of alignment process areas to the transmissive area and the reflective area according to the first embodiment of the present invention.

A structure for solving the problem of lowered contrast ratio and a alignment-segmentation process are described with reference to FIG. 8. FIG. 8 is a diagram illustrating the positional relation of alignment process areas to the transmissive area 101T and the reflective area 101R. The alignment-segmentation process in the structure of FIG. 8 includes performing a partial alignment process on one of the substrates in twice.

In FIG. 8, a first alignment process area 170 and a second alignment process area 171 are placed such that an overlapping region 172 is created in part of the reflective area 101R. Desirably, the length of the overlapping region 172 is set equal to or longer than necessary in light of the precision at which the first alignment process area 170 and the second alignment process area 171 are overlapped. This is to avoid creating a region that receives no alignment process when the first alignment process area and the second alignment process area are not positioned correctly. By placing the first alignment process area 170 and the second alignment process area 171 in the manner described above, a region in which the liquid crystal alignment direction shifts continuously can be created in a boundary between the transmissive area 101T and the reflective area 101R without fail.

The recommended order of alignment processes for the first alignment process area 170 and the second alignment process area 171 is to execute the alignment process for the second alignment process area 171 first and then execute the alignment process for the first alignment process area 170. A region that receives the double alignment processes is influenced by the alignment process that is performed later. Therefore, performing the alignment processes in the above-mentioned order places the boundary 177, which borders a first liquid crystal alignment region 168 and a second liquid crystal alignment region 169, deeper in the reflective are 101R past the boundary 163 between the transmissive area 101T and the reflective area 101R. The alignment direction in the overlapping region 172 is closer to the one in the transmissive area 101T. Thus, light leakage in the transmissive area in the black state can be reduced and the light transmission contrast can be improved.

In the case where mask rubbing is employed as an alignment method, the second alignment process area 171 receives mask rubbing first and then the first alignment process area 170 is subjected to mask rubbing. In the case where photoalignment is employed as an alignment method, the second alignment process area 171 receives a photoalignment process first and then a photoalignment process is performed on the first alignment process area 170.

Figure 9:
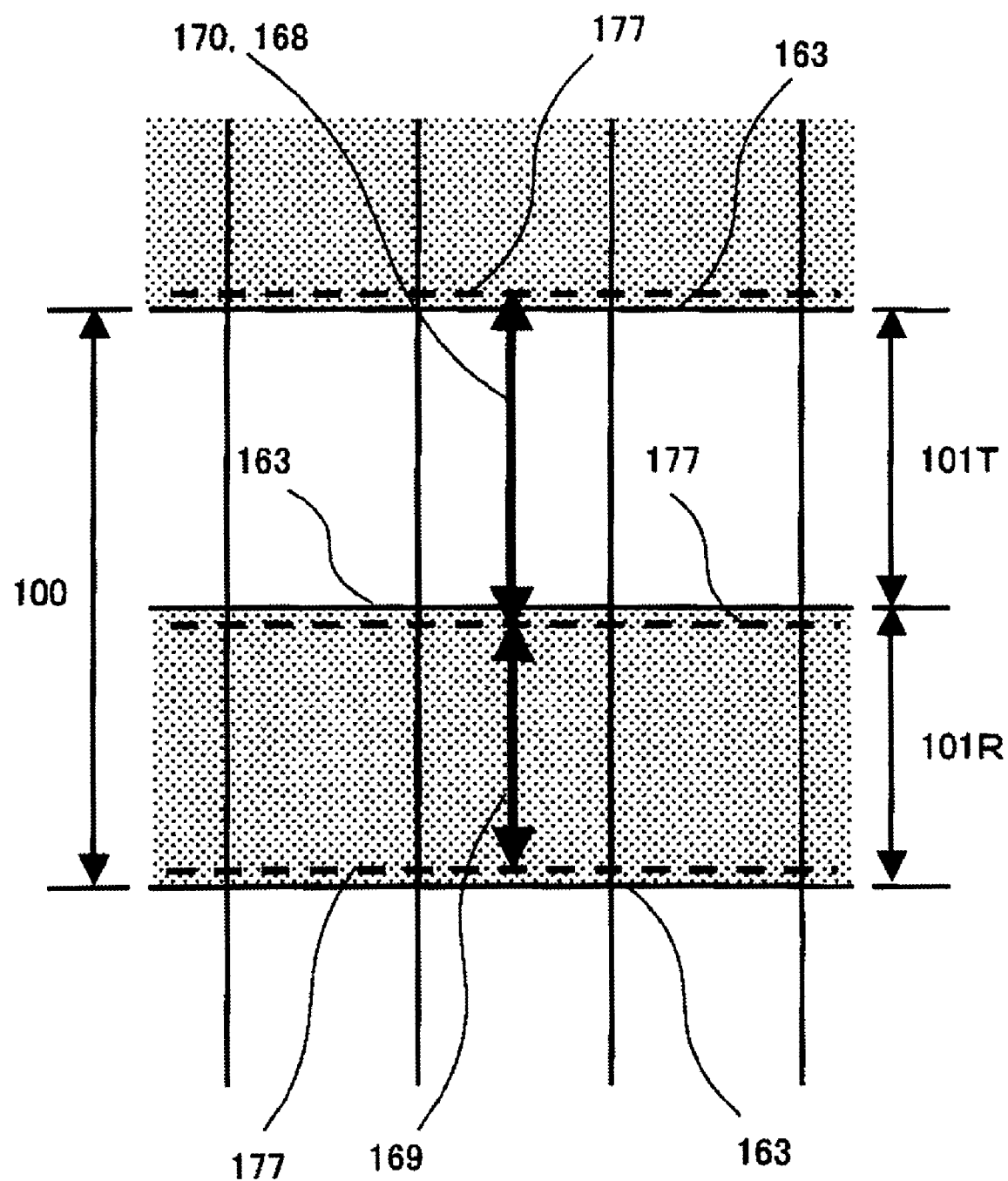
FIG. 9 is a diagram illustrating another example of the positional relation of the alignment process areas to the transmissive area and the reflective area according to the first embodiment of the present invention.

Another structure for solving the problem of lowered contrast ratio and another alignment-segmentation process are described with reference to FIG. 9. FIG. 9 is a diagram illustrating the positional relation of alignment process areas to the transmissive area 101T and the reflective area 101R. The alignment-segmentation process in the structure of FIG. 9 includes performing an alignment process on the entire surface of one of the substrates and then performing an alignment process only on the first alignment process area 170, which is a partial alignment process area. As a result, the first alignment process area 170 which is a partial alignment process area becomes the first liquid crystal alignment region 168 and the remaining area becomes the second liquid crystal alignment region 169.

When the employed alignment method is mask rubbing, the entire surface is rubbed and then an alignment process is performed by mask rubbing on the first alignment process area 170, which is a partial alignment process area. When the employed alignment method is photoalignment, the entire surface receives a photoalignment process and then a photoalignment process is performed on the first alignment process area 170, which is a partial alignment process area. In any case, the first alignment process area 170 which is a partial alignment process area is desirably set wider than the transmissive area 101T so that the alignment-segmentation boundary 177 between the first liquid crystal alignment region 168 and the second liquid crystal alignment region 169 is placed within the reflective area 101R.

According to the alignment-segmentation process described above, two regions processed by two types of alignment process respectively are brought into contact with each other without fail. Also, a region that receives no alignment process is not created since an alignment process is performed on the entire surface first. Moreover, since positioning is not required during a switch from one alignment process to the other alignment process, the overlapping region 172, which is necessary in FIG. 8, is eliminated and a wide area can be secured as an effective reflective display area.

Figure 10:
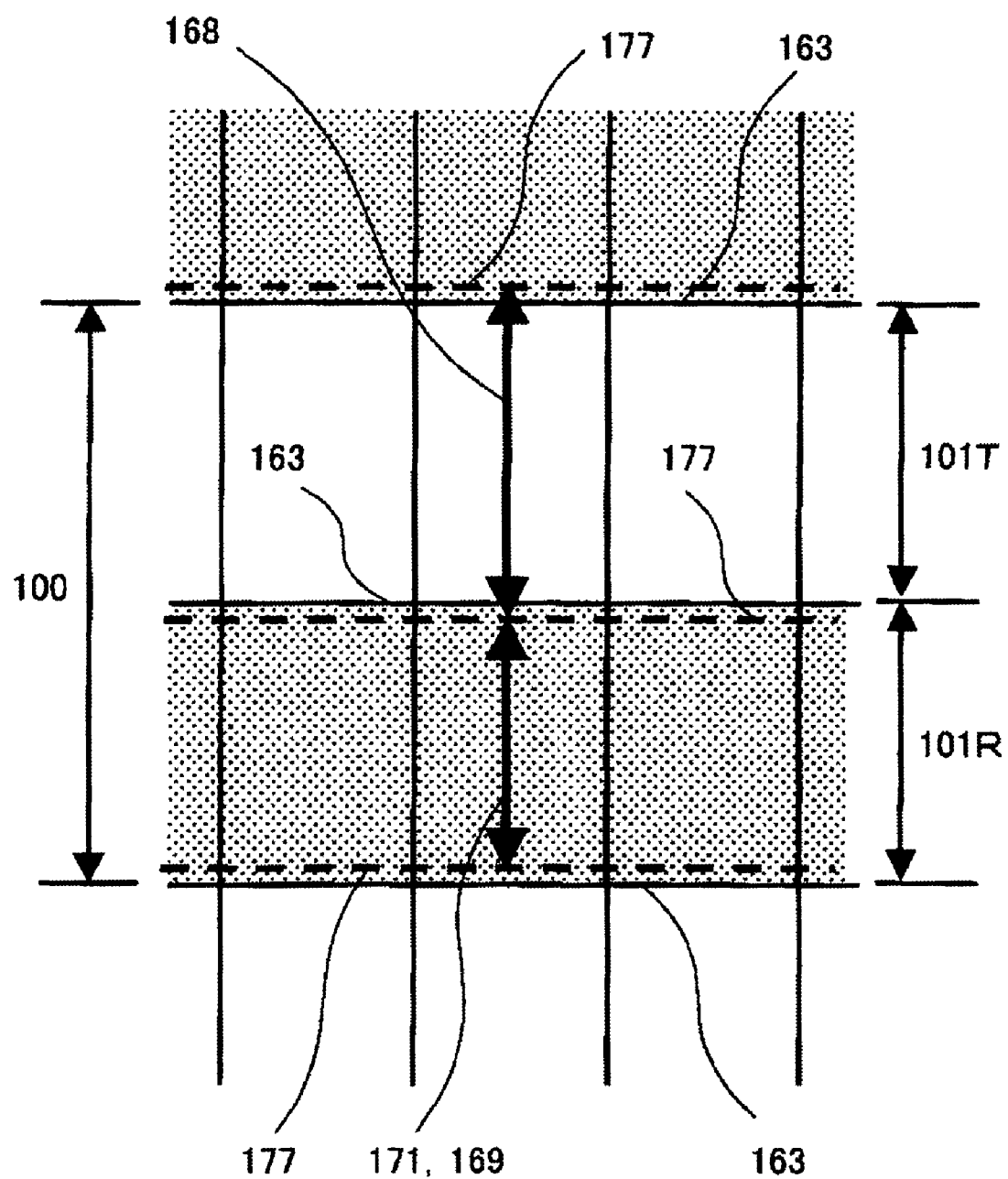
FIG. 10 is a diagram illustrating another example of the positional relation of the alignment process areas to the transmissive area and the reflective area according to the first embodiment of the present invention.

Another structure for solving the problem of lowered contrast ratio and another alignment-segmentation process are described with reference to FIG. 10. FIG. 10 is a diagram illustrating the positional relation of alignment process areas to the transmissive area 101T and the reflective area 101R. The alignment-segmentation process in the structure of FIG. 10 includes performing an alignment process on the entire surface of one of the substrates and then performing an alignment process only on the second alignment process area 171, which is a partial alignment process area. As a result, the second alignment process area 171 which is a partial alignment process area becomes the second liquid crystal alignment region 169 and the remaining area becomes the first liquid crystal alignment region 168.

When the employed alignment method is mask rubbing, the entire surface is rubbed and then an alignment process is performed by mask rubbing on the second alignment process area 171, which is a partial alignment process area. When the employed alignment method is photoalignment, the entire surface receives a photoalignment process and then a photoalignment process is performed on the second alignment process area 171, which is a partial alignment process area. In any case, the second alignment process area 171 which is a partial alignment process area is desirably set narrower than the transmissive area 101R so that the alignment-segmentation boundary 177 between the first liquid crystal alignment region 168 and the second liquid crystal alignment region 169 is placed within the reflective area 101R.

According to the alignment-segmentation process described above, two regions processed by two types of alignment process respectively are brought into contact with each other without fail. Also, a region that receives no alignment process is not created since an alignment process is performed on the entire surface first. Moreover, since positioning is not required during a switch from one alignment process to the other alignment process, the overlapping region 172, which is necessary in FIG. 8, is eliminated and a wide area can be secured as an effective reflective display area.

There are a few points to be kept in mind when forming the structures of FIG. 9 and FIG. 10 by the photoalignment method. To perform an additional photoalignment process on a partial alignment process area after the entire surface receives a photoalignment process inevitably causes a difference in light exposure amount between the partial alignment process area and the rest. In photoalignment, the anchoring strength and the light exposure amount have a correspondence relation. Accordingly, when the structures of FIG. 9 and FIG. 10 are formed by the photoalignment method, attention must be paid to the fact that the anchoring strength differs between the first liquid crystal alignment region 168 and the second liquid crystal alignment region 169.

This is because leaving the anchoring strength in one of the first liquid crystal alignment region 168 and the second liquid crystal alignment region 169 lower than an acceptable value causes a display error such as a afterimage phenomenon. While the problem of differing anchoring strengths in the first liquid crystal alignment region 168 and the second liquid crystal alignment region 169 is particularly noticeable when the photoalignment method is employed, the mask rubbing method, too, is not completely free from the possibility of differing anchoring strengths since different rubbing conditions are applied to the first liquid crystal alignment region 168 and the second liquid crystal alignment region 169. Checking if the anchoring strength in one of the liquid crystal alignment regions is lower than an acceptable value is therefore necessary for cases where the employed alignment method is mask rubbing as well.

The alignment-segmentation processes for the structures of FIG. 9 and FIG. 10 may use the rubbing method and the photoalignment method in combination. For example, alignment-segmentation can be accomplished by uniformly performing a rubbing process on the entire surface and then partially performing a photoalignment process. Conversely, a photoalignment process may be performed uniformly on the entire surface before partially performing a mask rubbing process to accomplish alignment-segmentation.

Second Embodiment

Figure 11A:
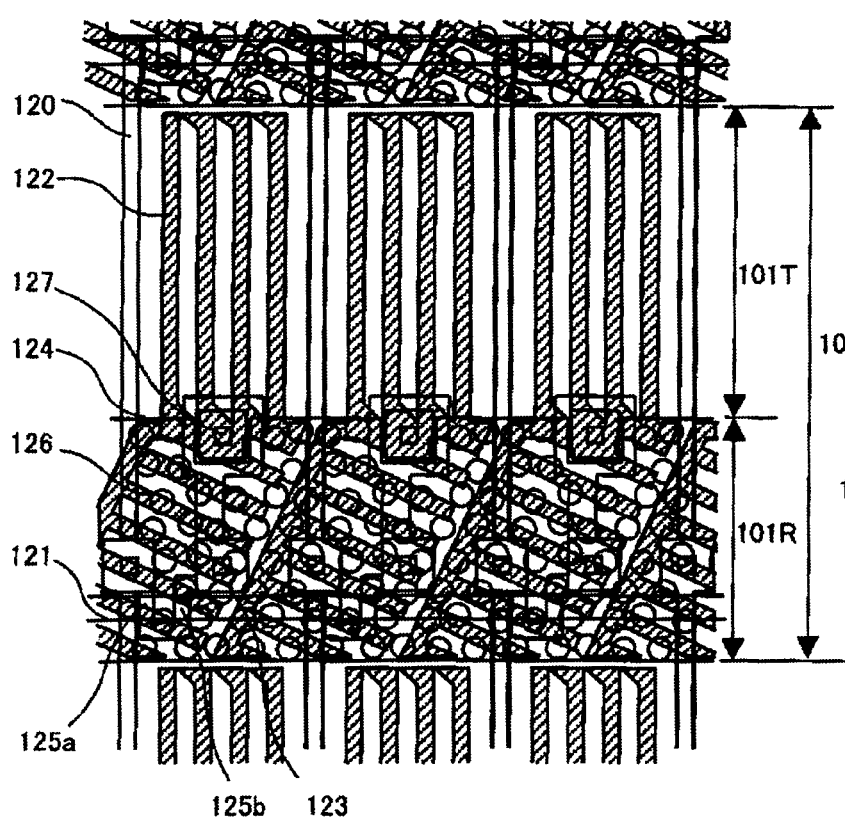
FIG. 11A is a plan view illustrating, enlarged, part of an active matrix substrate of a liquid crystal display device according to a second embodiment of the present invention.
Figure 11B:
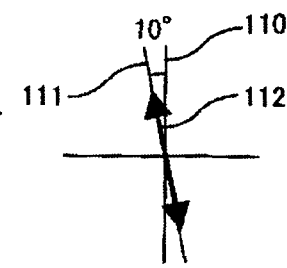
FIG. 11B illustrates a liquid crystal alignment direction, an optical axis, and a comb-teeth-shaped electrode direction in a transmissive area according to the second embodiment of the present invention.
Figure 11C:
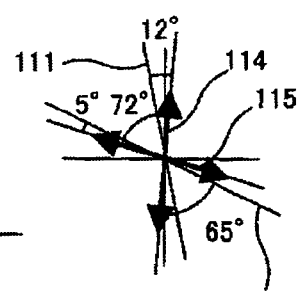
FIG. 11C illustrates liquid crystal alignment directions, the optical axis, and a comb-teeth-shaped electrode direction in a reflective area according to the second embodiment of the present invention.

The structure of a liquid crystal display device according to a second embodiment of the present invention is described with reference to FIGS. 11A to 11C. FIG. 11A is a plan view illustrating, enlarged, part of an active matrix substrate that constitutes the liquid crystal display device according to the second embodiment of the present invention. FIGS. 11B and 11C are explanatory diagrams of the liquid crystal alignment directions, the optical axis, and the comb-teeth-shaped electrode direction. The second embodiment differs from the first embodiment of the present invention in that the reflective area 101R provided in each pixel has a parallelogrammatic shape in the second embodiment instead of a rectangular shape as in the first embodiment. The tilt angle of this parallelogram is set such that the slant is perpendicular to the longitudinal direction of the comb-teeth-shaped signal electrode 122 in the reflective area 101R. In-plane switching (IPS) is a method of driving the liquid crystal layer with an electric field component that is perpendicular to the longitudinal direction of the comb-teeth-shaped electrode. Therefore, by setting the tilt angle of the parallelogram such that the slant is perpendicular to the longitudinal direction of the comb-teeth-shaped signal electrode 122, an effective area of the liquid crystal layer to which an electric field component perpendicular to the longitudinal direction of the comb-teeth-shaped signal electrode is applied can be widened.

With the pixel structure of this embodiment, too, the positional relations of the first alignment process area 170 and/or the second alignment process area 171, and the first alignment region 168 and the second alignment region 169 which are determined by the positional relations can be selected from the structures of FIGS. 8, 9, and 10. The liquid crystal alignment direction 112 in the transmissive area 101T is the same on the first substrate 130 and the second substrate 143: in short, the liquid crystal alignment in the transmissive area 101T is homogeneous alignment. The liquid crystal alignment direction 112 is parallel to or orthogonal to the optical axis (transmission axis or absorption axis) 111 of the polarizing plates 144. In the liquid crystal display device according to this embodiment, the longitudinal direction 110 of the comb-teeth-shaped signal electrode 122 in the transmissive area 101T and the liquid crystal alignment direction 112 form an angle of 10°.

On the other hand, in the liquid crystal alignment of the second alignment region located in the reflective area 101R, the liquid crystal alignment direction 115 on the first substrate 130 and the liquid crystal alignment direction 114 on the second substrate 143 are different from each other: in short, the liquid crystal alignment in the second alignment region is twist nematic alignment. Also, the longitudinal direction 113 of the comb-teeth-shaped signal electrode 122 in the reflective area 101R differs from the longitudinal direction 110 of the comb-teeth-shaped signal electrode 122 in the transmissive area 101T.

In this embodiment, 72° is set as the twist angle which is an angle formed by the liquid crystal alignment direction 115 on the first substrate 130 and the liquid crystal alignment direction 114 on the second substrate 143. An angle formed by the optical axis 111 of the polarizing plates 144 in the reflective area 101R and the liquid crystal alignment direction 114 on the second substrate 143 is set to 12°. An angle formed by the longitudinal direction 110 of the comb-teeth-shaped signal electrode 122 in the transmissive area 101T and the longitudinal direction 113 of the comb-teeth-shaped signal electrode 122 in the reflective area 101R is set to 65°. An angle formed by the liquid crystal alignment direction 115 on the first substrate 130 in the reflective area 101R and the longitudinal direction 113 of the comb-teeth-shaped signal electrode 122 in the reflective area 101R is set to 5° This corresponds to 85° as the pre-twist angle 116.

Third Embodiment

Figure 12A:
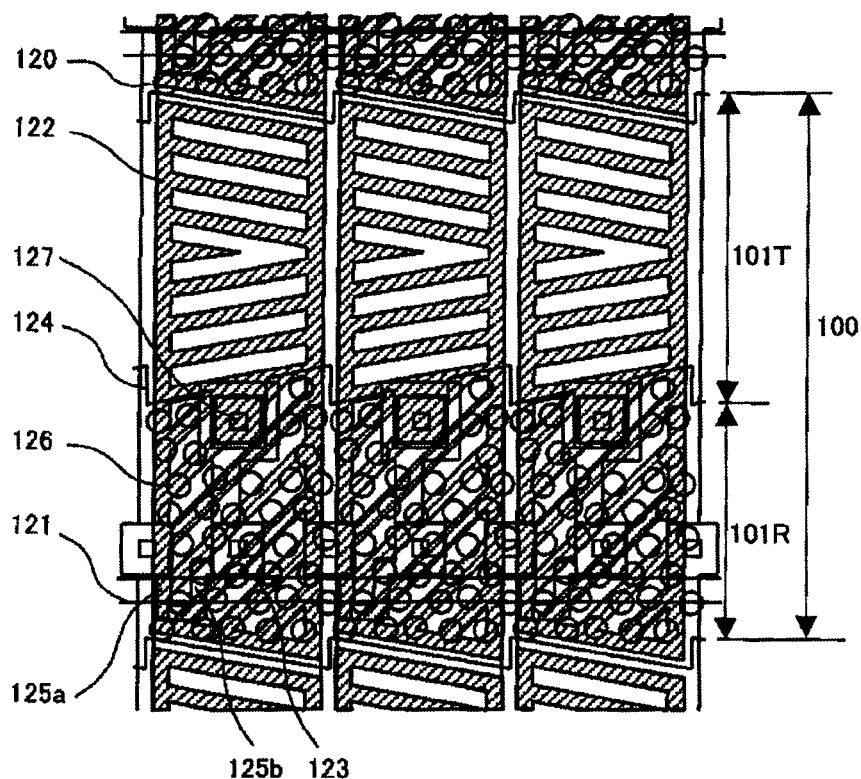
FIG. 12A is a plan view illustrating, enlarged, part of an active matrix substrate of a liquid crystal display device according to a third embodiment of the present invention.
Figure 12B:
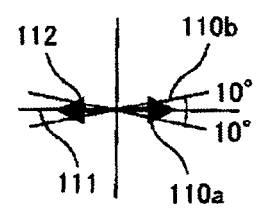
FIG. 12B illustrates a liquid crystal alignment direction, an optical axis, and comb-teeth-shaped electrode direction in a transmissive area according to the third embodiment of the present invention.
Figure 12C:
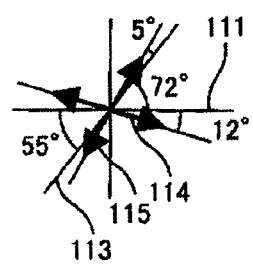
FIG. 12C illustrates liquid crystal alignment directions, the optical axis, and a comb-teeth-shaped electrode direction in a reflective area according to the third embodiment of the present invention.

The structure of a liquid crystal display device according to a third embodiment of the present invention is described with reference to FIGS. 12A to 12C. The third embodiment of the present invention differs from the first embodiment of the present invention in that the transmissive area in the third embodiment has a multi-domain structure. The comb-teeth-shaped signal electrode 122 in the transmissive area 101T has two longitudinal directions (110a and 110b), which orients the electric field for driving the liquid crystal layer in two directions and causes two types of domain to be formed. The two different domains compensate each other's viewing angle characteristics, thereby improving the overall viewing angle characteristics of the liquid crystal display device.

Figure 13:
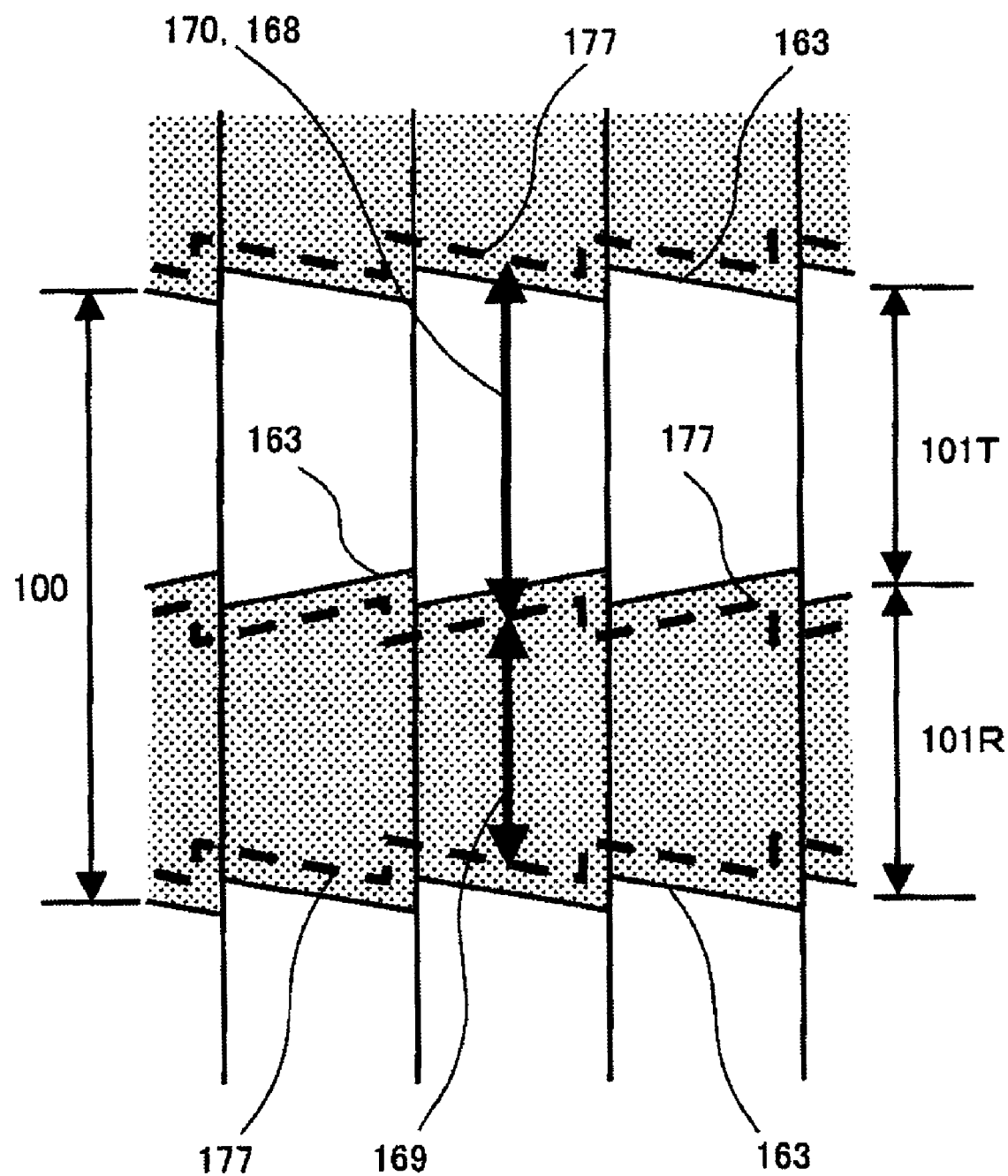
FIG. 13 is a diagram illustrating a positional relation of alignment process areas to the transmissive area and the reflective area according to the third embodiment of the present invention.

FIG. 13 illustrates the location of the first alignment process area 170 when the pixel structure of this embodiment is employed and the positional relation between the first alignment region 168 and the second alignment region 169 which is determined by the location of the first alignment process area 170. FIG. 13 is a diagram illustrating the positional relation of the alignment process areas to the transmissive area and the reflective area. A alignment-segmentation process in the structure of FIG. 13 is similar to the one described with reference to FIG. 10, and includes performing an alignment process on the entire surface of one of the substrates and then performing an alignment process only on the first alignment process area 170, which is a partial alignment process area.

As a result, the partial alignment process area becomes the second alignment process area 171 and the remaining area becomes the first alignment process area 170. The slant of the boundary 163 between the transmissive area 101T and the reflective area 101R is echoed by the slant of the alignment-segmentation boundary 177 between the first alignment process area 170 and the second alignment process area 171.

On the other hand, in the liquid crystal alignment of the second alignment region 171 located in the reflective area 101R, the liquid crystal alignment direction 115 on the first substrate 130 and the liquid crystal alignment direction 114 on the second substrate 143 are different from each other: in short, the liquid crystal alignment in the second alignment region 171 is twist nematic alignment. Also, the longitudinal direction 113 of the comb-teeth-shaped signal electrode 122 in the reflective area 101R differs from any of the longitudinal directions 110a and 110b of the comb-teeth-shaped signal electrode 122 in the transmissive area 101T.

In this embodiment, 72° is set as the twist angle which is an angle formed by the liquid crystal alignment direction 115 on the first substrate 130 and the liquid crystal alignment direction 114 on the second substrate 143. An angle formed by the optical axis 111 of the polarizing plates 144 in the reflective area 101R and the liquid crystal alignment direction 114 on the second substrate 143 is set to 12°. An angle formed by the longitudinal direction 110 of the comb-teeth-shaped signal electrode 122 in the transmissive area 101T and the longitudinal direction 113 of the comb-teeth-shaped signal electrode 122 in the reflective area 101R is set to 45°. An angle formed by the liquid crystal alignment direction 115 on the first substrate 130 in the reflective area 101R and the longitudinal direction 113 of the comb-teeth-shaped signal electrode 122 in the reflective area 101R is set to 5°. This corresponds to 85° as the pre-twist angle 116.

Fourth Embodiment

Alignment-segmentation requires performing an alignment process twice for each of the two substrates, unlike most of other alignment methods where an alignment process is performed once, and causes a heavy process load. As a way to lighten the process load, the fourth embodiment of the present invention describes a method in which alignment-segmentation is accomplished in a single step of overall light exposure when the employed alignment method is photoalignment. The above-mentioned embodiments of the present invention employ an alignment method in which an exposure device that emits polarized ultraviolet light for photoalignment is used in combination with a photomask to irradiate a partial region with the polarized light.

Figure 14:
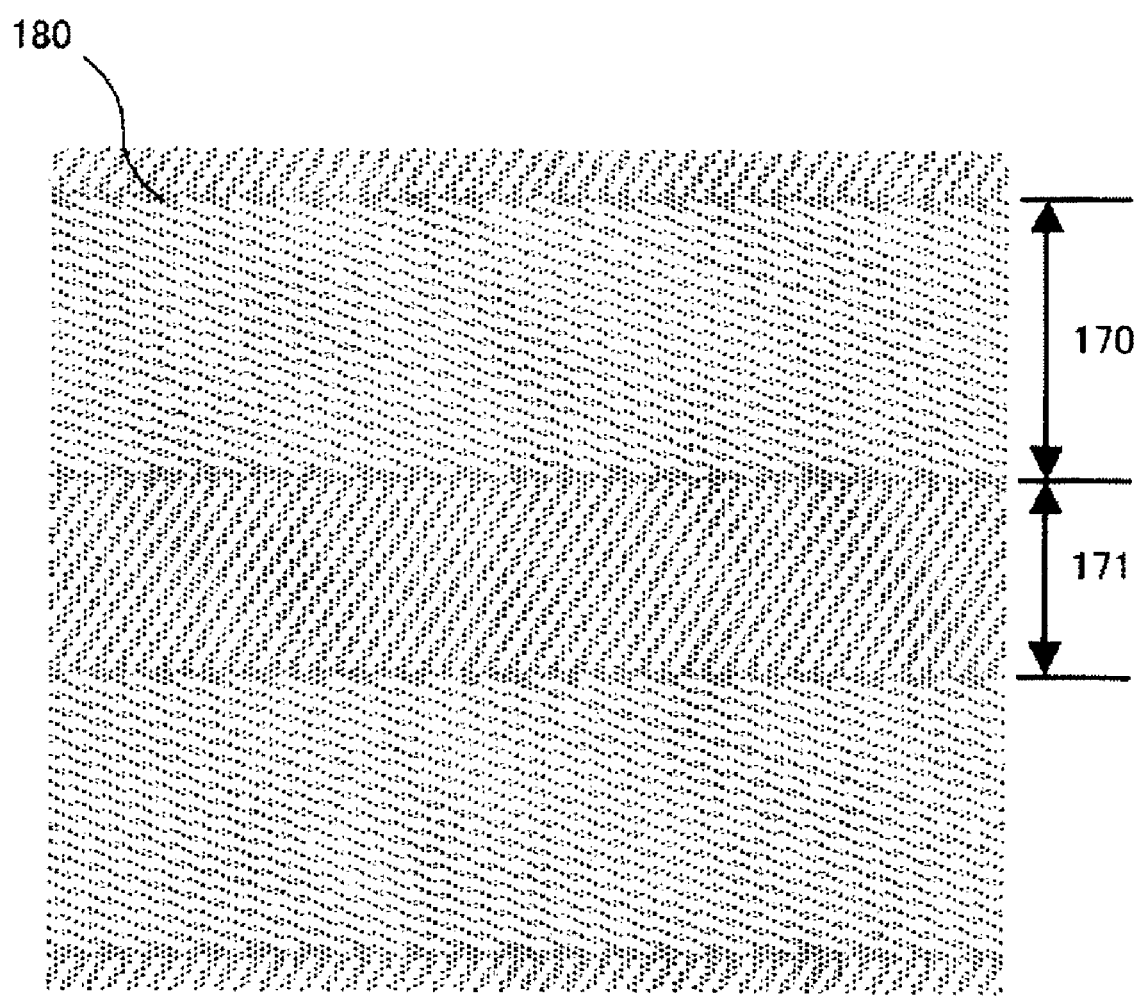
FIG. 14 illustrates a structural example of a polarizing photomask according to a fourth embodiment of the present invention.

This embodiment, on the other hand, uses an exposure device that emits unpolarized UV light. The major feature of this embodiment is that a polarizing photomask that polarizes each region differently from each other is employed. FIG. 14 illustrates a structural example of a polarizing photomask 180. FIG. 14 is an enlarged view of part of a polarizing photomask 180. The polarizing photomask 180 is structured such that grating polarizers having different polarization axes are placed side by side to mask different alignment process areas (170 and 171) respectively. The specific structures of grating polarizers are described in detail in U.S. Pat. No. 6,122,103B. According to the alignment-segmentation method of this embodiment, alignment-segmentation is accomplished by performing light exposure once, and an increase in process load due to alignment-segmentation is thus avoided. In addition, since liquid crystal alignment regions aligned in different directions are created in a single step of light exposure, the liquid crystal alignment regions are brought into contact with each other without fail, which means that a liquid crystal display device having high aperture ratio, high transmittance, and high reflectance can be obtained.

Fifth Embodiment

A fifth embodiment of the present invention describes a structure for enhancing the reflection contrast even more. In FIG. 4A, which indicates a condition for setting the black reflectance (the reflectance in the black state) to 0, the axis of ordinate represents $d\Delta n/\lambda$, namely the wavelength dependency. At one value of $d\Delta n$, only a specific wavelength sets the black reflectance to 0 and other wavelengths do not make the black reflectance 0. The black reflectance of a panel is determined from the spectrum of illumination light cast to the panel, the black reflectance spectrum, and the spectral luminous efficacy. One way to lower the black reflectance of a panel even more is to set $d\Delta n$ for each pixel to an optimum value suited to the color (central wavelength) of the pixel. However, varying the value of $d\Delta n$ from one pixel to another requires changing one or both of the liquid crystal layer thickness (d) and the liquid crystal layer refractive index anisotropy ($\Delta n$) for each pixel. This is accomplished by, for example, setting the thickness of the reflection gap control layer 139 on the second substrate differently for different colors.

Figure 15:
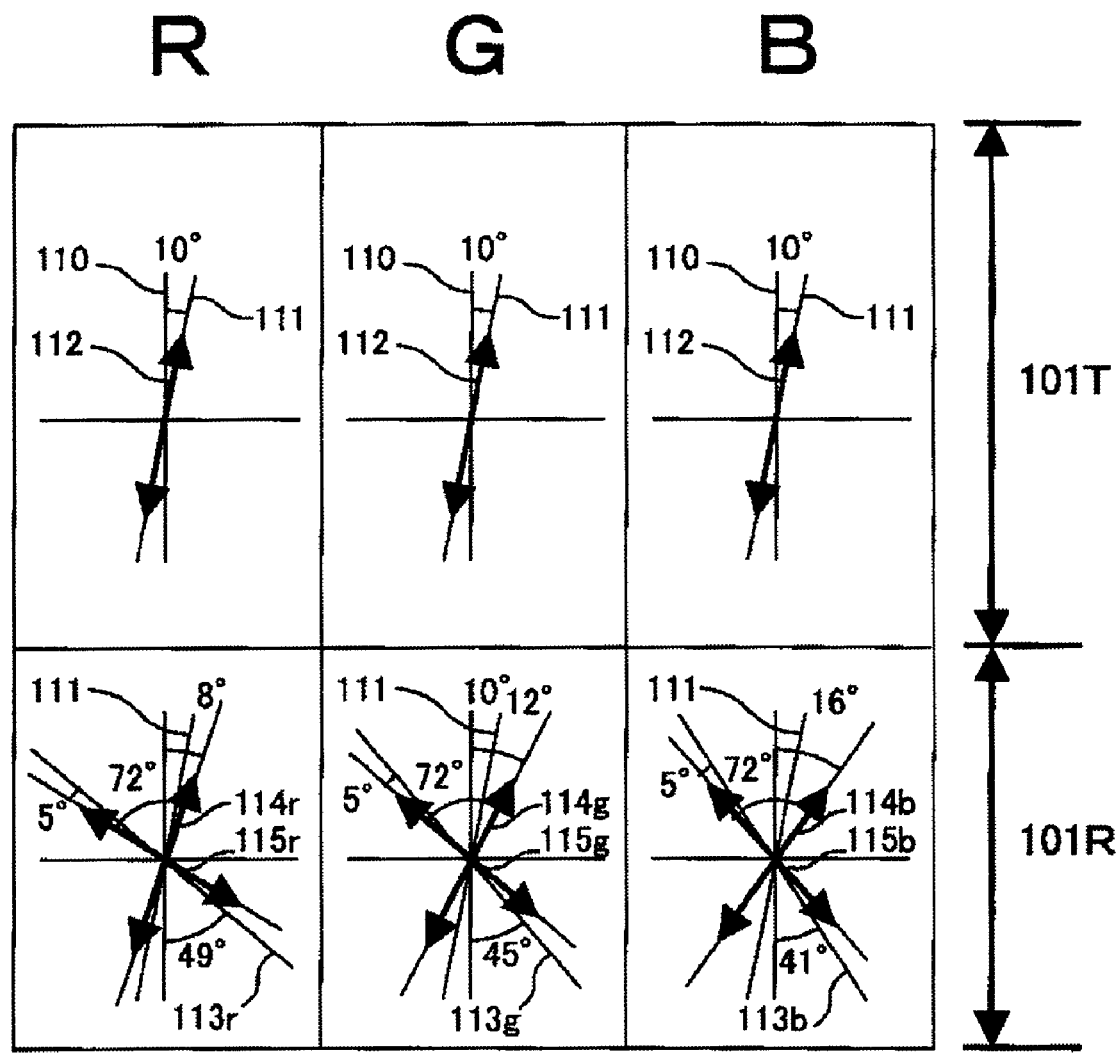
FIG. 15 is a diagram illustrating structure of a liquid crystal display device according to a fifth embodiment of the present invention.

Another way to enhance the reflection contrast is to vary the liquid crystal alignment direction from one color to another. An advantage of this method is that it is not strictly necessary to set different liquid crystal layer thicknesses to different colors. FIG. 15 is an explanatory diagram of the structure of a liquid crystal display device according to the fifth embodiment of the present invention. The liquid crystal display device has pixels for the three primary colors, red (R), green (G), and blue (B). An angle formed between the liquid crystal alignment direction 114 on the second substrate in the reflective area and the polarizing plate optical axis 111 is set to 8° (114r) in R pixels, 12° (114g) in G pixels, and 16° (114b) in B pixels. The twist angle is not varied. The liquid crystal alignment direction 115 on the first substrate is also varied from one color to another (115r, 115g, 115b), and the longitudinal direction 113 of the comb-teeth-shaped signal electrode in the reflective area is also varied from one color to another (113r, 113g, 113b).

Figure 16:
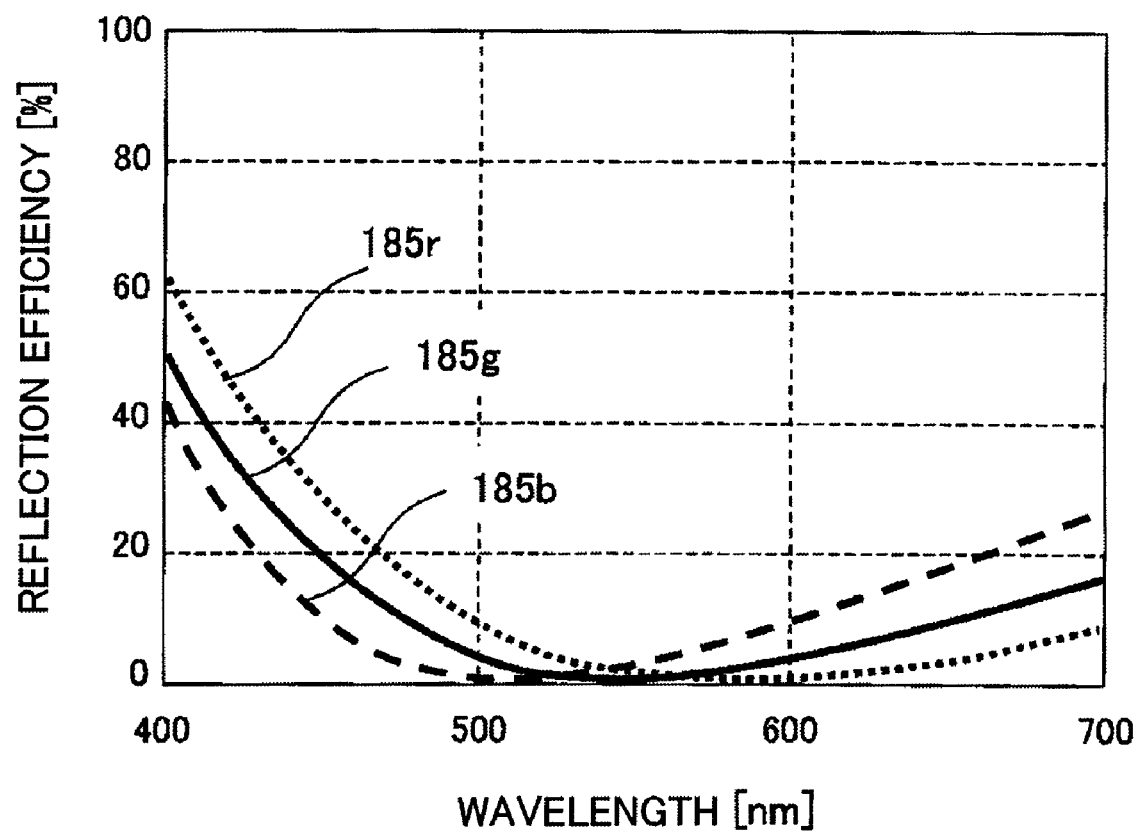
FIG. 16 is a graph illustrating spectra of black reflection efficiency according to the fifth embodiment of the present invention.

FIG. 16 illustrates black reflectance spectra (185r, 185g, and 185b) in the structure of FIG. 15. Different colors take a local minimum value of the black reflectance spectrum at different wavelengths. Compared to the black reflectance spectrum 185g of G pixels, a wavelength at which R pixels take a local minimum value of the black reflectance spectrum 185r is on the long wavelength side, a wavelength at which B pixels take a local minimum value of the black reflectance spectrum 185b is on the short wavelength side. The black reflectance of the panel can thus be lowered even more. As a next best method to the above-mentioned example where the liquid crystal alignment directions 115 on the first substrate, the liquid crystal alignment directions 114 on the second substrate and the longitudinal direction 113 of the comb-teeth-shaped signal electrode are varied from one color to another, only the liquid crystal alignment direction 115 on the first substrate may be changed from color to color. This simpler method can provide substantially the same effects as the above-mentioned method.

Sixth Embodiment

Figure 17:
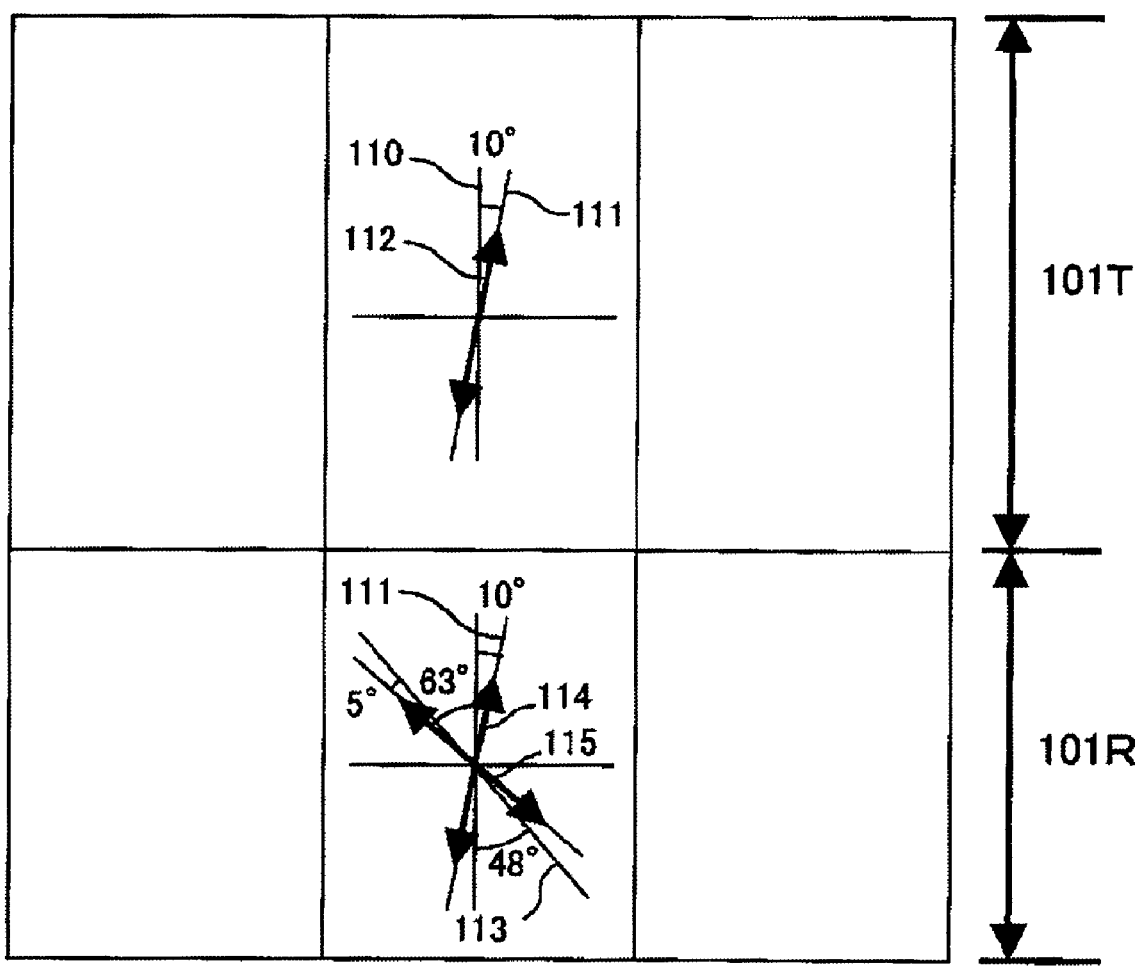
FIG. 17 is a diagram illustrating structure of a liquid crystal display device according to a sixth embodiment of the present invention.

The structure of a liquid crystal display device according to a sixth embodiment of the present invention is described with reference to FIG. 17. FIG. 17 is an explanatory diagram of the structure of the liquid crystal display device according to the sixth embodiment of the present invention. In the first to fifth embodiment of the present invention, alignment-segmentation is performed on the first substrate and the second substrate both. In the structure of this embodiment, alignment-segmentation is performed on the first substrate but not on the second substrate. It is understood from FIG. 4B that the liquid crystal alignment angle θ is 0° in a range where the twist angle φ is between 63° and 64°. This means that the polarizing plate optical axis 111 on the second substrate and the liquid crystal alignment direction 114 on the second substrate are in the same direction in the reflective area 101R as in the transmissive area 101T. Accordingly, by selecting an angle between 63° and 64° as the twist angle φ, alignment-segmentation on the second substrate is eliminated, though the first substrate still needs alignment-segmentation.

Since the alignment direction is set usually in one-degree increments in a liquid crystal alignment process, the twist angle φ may be set to 63° or 64°. When the liquid crystal alignment direction can be controlled with a higher precision than that, setting the twist angle φ to an angle between 63° and 64° may be more desirable.

In the structure of FIG. 17, the twist angle φ is set to 63°. An angle formed by the polarizing plate optical axis 111 in the transmissive area 101T and the longitudinal direction 110 of the comb-teeth-shaped signal electrode 122 is set to 10°. The same direction is set as the liquid crystal alignment direction 114 on the second substrate in the reflective area 101R and the liquid crystal alignment direction 112 in the transmissive area 101T. An angle formed by the longitudinal direction 113 of the signal electrode 122 in the reflective area 101R and the longitudinal direction 110 of the signal electrode 122 in the transmissive area 101T is set to 48°. An angle formed by the liquid crystal alignment direction 115 on the first substrate and the longitudinal direction 113 of the signal electrode 122 in the reflective area 101R is set to 5°. This corresponds to 85° as the pre-twist angle 116.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device comprising:
   a first substrate which has a plurality of pixels and a first alignment film, the plurality of pixels being arranged in matrix and each having a signal electrode and a common electrode, the first alignment film covering the plurality of pixels, the plurality of pixels each having a transmissive area and a reflective area;
   a second substrate which has a second alignment film; and
   a liquid crystal layer which is held between the first alignment film of the first substrate and the second alignment film of the second substrate, and which is driven with a voltage applied between the signal electrode and the common electrode,
   wherein each of the plurality of pixels has a first liquid crystal alignment region and a second liquid crystal alignment region each of which has a different liquid crystal alignment direction,
   wherein the first liquid crystal alignment region and the second liquid crystal alignment region are adjacent to each other within each of the plurality of pixels,
   wherein each of the plurality of pixels has a boundary region whose liquid crystal alignment direction shifts continuously from the liquid crystal alignment direction of the first liquid crystal alignment region to the liquid crystal alignment direction of the second liquid crystal alignment region between the adjacent first liquid crystal alignment region and second liquid crystal alignment region, and
   wherein the first liquid crystal alignment region is wider than the transmissive area, and the second liquid crystal alignment region is narrower than the reflective area.

2. A liquid crystal display device according to claim 1, wherein at least one of the first alignment film and the second alignment film receives a liquid crystal alignment process through photoalignment, and
   wherein the liquid crystal alignment process of the at least one of the first alignment film and the second alignment film includes performing a photoalignment process on an entire surface of the at least one of the first alignment film and the second alignment film and then performing a partial photoalignment process on one of the first liquid crystal alignment region and the second liquid crystal alignment region.

3. A liquid crystal display device according to claim 1, wherein at least one of the first alignment film and the second alignment film receives a liquid crystal alignment process through rubbing, and
   wherein the liquid crystal alignment process of the at least one of the first alignment film and the second alignment film includes performing a rubbing process on an entire surface of the at least one of the first alignment film and the second alignment film and then performing a partial mask rubbing process on one of the first liquid crystal alignment region and the second liquid crystal alignment region.

4. A liquid crystal display device according to claim 3, wherein the liquid crystal alignment process of the at least one of the first alignment film and the second alignment film includes performing the rubbing process on the entire surface of the at least one of the first alignment film and the second alignment film and then performing a mask rubbing process on the first liquid crystal alignment region that contains the whole transmissive area and part of the reflective area.

5. A liquid crystal display device according to claim 3, wherein the liquid crystal alignment process of the at least one of the first alignment film and the second alignment film includes performing the rubbing process on the entire surface of the at least one of the first alignment film and the second alignment film and then performing a mask rubbing process on the second liquid crystal alignment region that is part of the reflective area.

6. A liquid crystal display device according to claim 1, wherein the first liquid crystal alignment region and the second liquid crystal alignment region are created by performing an alignment process separately and partially at least twice, and have an alignment process overlapping region in which alignment process regions of the first liquid crystal alignment region and the second liquid crystal alignment region partially overlap each other.

7. A liquid crystal display device according to claim 6, wherein the overlapping region has a width greater than required for a positioning precision in the alignment process performed separately and partially at least twice.

8. A liquid crystal display device according to claim 6, wherein the overlapping region is located in the reflective area.

9. A liquid crystal display device according to claim 1, wherein the first liquid crystal alignment region and the second liquid crystal alignment region come into contact with each other within the reflective area.

10. A liquid crystal display device according to claim 1, wherein the second liquid crystal alignment region comprises regions to which different liquid crystal alignment directions are set for three primary colors.

11. A liquid crystal display device according to claim 1,
wherein at least one of the first alignment film and the second alignment film receives a liquid crystal alignment process through photoalignment, and
wherein the liquid crystal alignment process through photoalignment is alignment-segmentation in which overall light exposure is performed in a single step using a photomask that polarizes along multiple polarization axes.

12. A liquid crystal display device according to claim 11, wherein the photomask has a plurality of grating polarizers having different arrangement directions and placed side by side.

13. A liquid crystal display device according to claim 1,
wherein the signal electrode in the transmissive area is arranged in at least two different angled arrangement directions, and
wherein the at least two different angled arrangement directions of the signal electrode in the transmissive area are different from an arrangement direction of the signal electrode in the reflective area.

14. A liquid crystal display device according to claim 1, wherein the reflective area is shaped approximately like a parallelogram, and a comb-teeth-shaped electrode in this reflective area runs one of orthogonal to and parallel to a side of the parallelogram.

15. A liquid crystal display device according to claim 1,
wherein the first substrate and the second substrate each have a polarizing plate,
wherein a liquid crystal alignment direction of the second alignment film is the same in the first liquid crystal alignment region and the second liquid crystal alignment region, and
wherein an optical axis of the polarizing plate on the second substrate in the reflective area and the liquid crystal alignment direction of the second alignment film are set to the same direction.

16. A liquid crystal display device according to claim 1, wherein the first liquid crystal alignment region and the second liquid crystal alignment region have different levels of anchoring strength.

* * * * *